(12) United States Patent
Takeuchi

(10) Patent No.: US 6,450,647 B1
(45) Date of Patent: Sep. 17, 2002

(54) IMAGE PROCESSING DEVICE AND IMAGE PROCESSING METHOD

(75) Inventor: Kesatoshi Takeuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 201 days.

(21) Appl. No.: 09/640,982

(22) Filed: Aug. 18, 2000

Related U.S. Application Data

(63) Continuation of application No. PCT/JP99/00632, filed on Feb. 12, 1999.

(30) Foreign Application Priority Data

Feb. 18, 1998 (JP) .......................................... 10-054530
Oct. 28, 1998 (JP) .......................................... 10-324587

(51) Int. Cl.$^7$ ............................................ G03B 21/00
(52) U.S. Cl. ......................................... 353/69; 353/70
(58) Field of Search ..................... 353/69, 70; 348/745, 348/806

(56) References Cited

FOREIGN PATENT DOCUMENTS

| JP | 4-323979 | 11/1992 |
|----|----------|---------|
| JP | 5-037880 | 2/1993 |
| JP | 6-082751 | 3/1994 |
| JP | 8-289237 | 11/1996 |
| JP | 8-336092 | 12/1996 |
| JP | 9-149284 | 6/1997 |
| JP | 9-261568 | 10/1997 |
| JP | 9-261569 | 10/1997 |

*Primary Examiner*—William Dowling
(74) *Attorney, Agent, or Firm*—Oblon, Spivak, McClelland, Maier & Neustadt, P.C.

(57) ABSTRACT

A display pixel range between a display start position and a display end position of a distortion corrected image is determined on each horizontal line of the image forming section, based on horizontal correction parameters representing distortion-correction amounts at left- and right-sides of the distortion-corrected image to be supplied to an image forming section for forming an image to be projected onto a screen, and a first relation between each pixel within the display pixel range and each pixel in the original image is determined. A display line range between a display start line and a display end line of the distortion corrected image is also determined on the image forming section, based on vertical correction parameters representing distortion-correction amounts in the vertical direction of the distortion-corrected image, a second relation between each line within the display line range and each line in the original image is determined. The distortion-corrected image is produced from the original image according to the first and second relations. This allows easy correction of image distortion due to tilt projection of images onto the screen.

48 Claims, 19 Drawing Sheets

Fig. 7(A) FRAME MEMORY 120
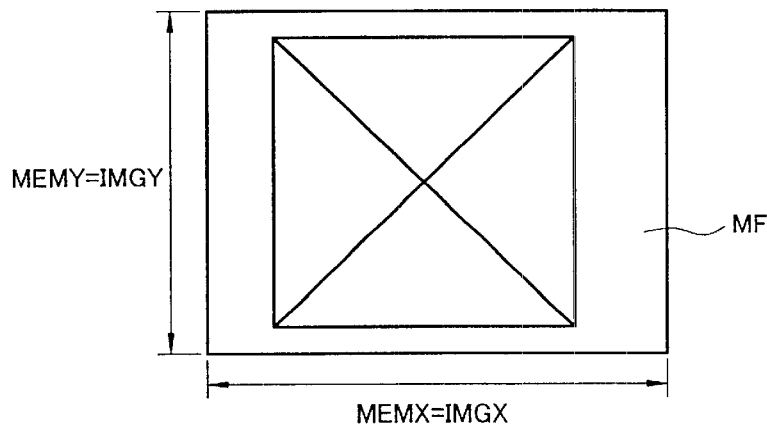
Fig. 7(B) AFTER HORIZONTAL CORRECTION
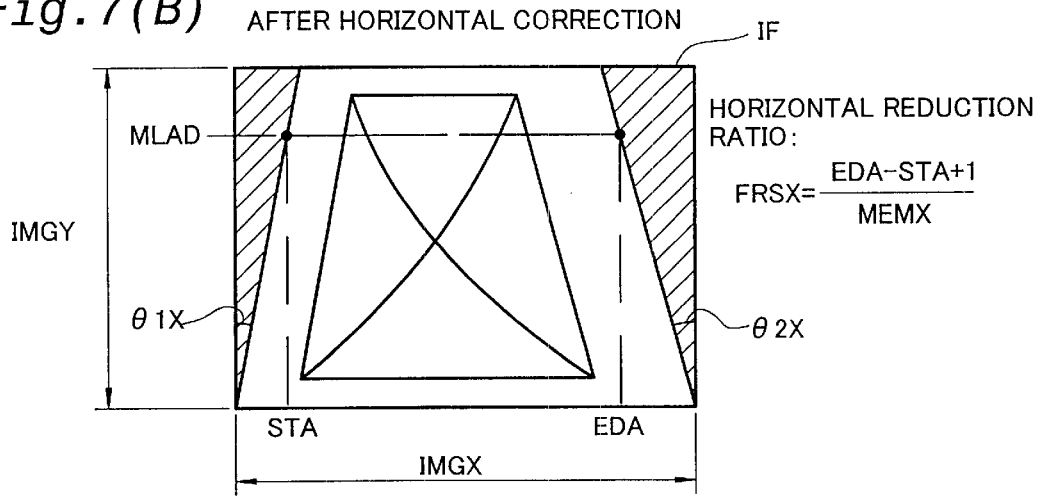
HORIZONTAL REDUCTION RATIO:
$$FRSX = \frac{EDA-STA+1}{MEMX}$$
Fig. 7(C) AFTER VERTICAL CORRECTION
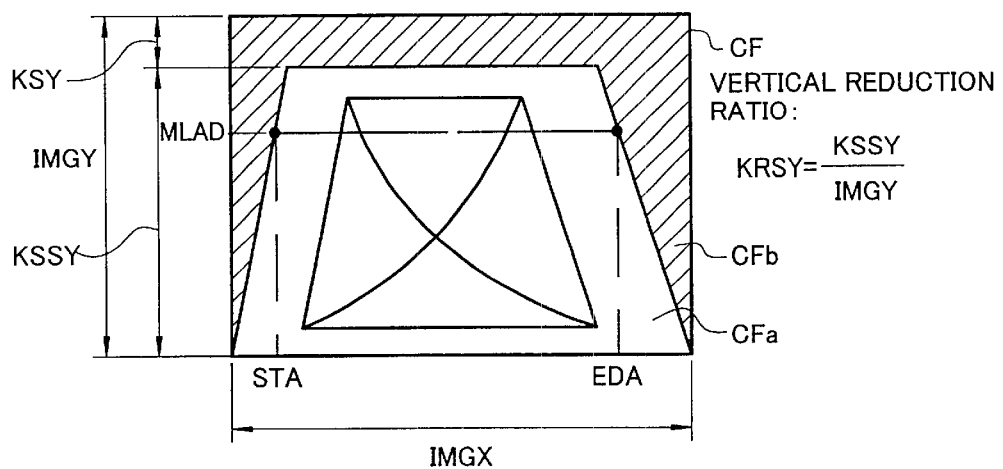
VERTICAL REDUCTION RATIO:
$$KRSY = \frac{KSSY}{IMGY}$$

Fig.8

CALCULATION OF HORIZONTAL TRAPEZOIDAL
CORRECTION PARAMETERS
(FOR EACH LINE)

| LAD | DSPV | MLAD* | STA | EDA | FRSX |
|-----|------|-------|-----|-----|-------|
| 0   | L    | 0     | 40  | 639 | 0.857 |
| ≀   |      |       |     |     |       |
| 69  | L    | 0     | 40  | 639 | 0.857 |
| 70  | H    | 0     | 40  | 639 | 0.857 |
| 71  | H    | 1     | 40  | 639 | 0.857 |
| 72  | H    | 3     | 40  | 639 | 0.858 |
| ≀   |      |       |     |     |       |
| 75  | H    | 6     | 40  | 640 | 0.859 |
| ≀   |      |       |     |     |       |
| 80  | H    | 13    | 39  | 641 | 0.861 |
| ≀   |      |       |     |     |       |
| 99  | H    | 36    | 37  | 643 | 0.867 |
| ≀   |      |       |     |     |       |
| 199 | H    | 161   | 27  | 658 | 0.903 |
| ≀   |      |       |     |     |       |
| 299 | H    | 229   | 22  | 667 | 0.923 |
| ≀   |      |       |     |     |       |
| 399 | H    | 329   | 14  | 679 | 0.951 |
| ≀   |      |       |     |     |       |
| 499 | H    | 499   | 0   | 699 | 1.000 |

Fig. 9

CALCULATION OF HORIZONTAL TRAPEZOIDAL CORRECTION PARAMETERS (FOR EACH PIXEL)

| FRSX | PAD | PADC1 | BPAD | RSPAD | PADC2 | MPAD | DSPH | SELH | RV1 | RV2 | |
|---|---|---|---|---|---|---|---|---|---|---|---|
| | 0 | L | 0 | 0 | L | 0 | L | L | – | VBLK | SUPPLEMENTARY IMAGE CFb |
| | ~ | | | | | | | | | | |
| 0.857 | 39 | L | 0 | 0 | L | 0 | L | L | – | VBLK | |
| | 40 | H | 0 | 0 | L | 0 | H | L | DP0 | DP0 | TRAPEZOID IMAGE CFa |
| | 41 | H | 1 | 1 | L | 1 | H | L | DP1 | DP1 | |
| | 42 | H | 2 | 2 | L | 2 | H | L | DP2 | DP2 | |
| | 43 | H | 3 | 3 | L | 3 | H | L | DP3 | DP3 | |
| | 44 | H | 4 | 4 | L | 4 | H | L | DP4 | DP4 | |
| | 45 | H | 5 | 5 | L | 5 | H | L | DP5 | DP5 | |
| | 46 | H | 6 | 7 | H | 7 | H | H | DP7 | (DP5+DP7)/2 | |
| | 47 | H | 7 | 8 | L | 8 | H | L | DP8 | DP8 | |
| | 48 | H | 8 | 9 | L | 9 | H | L | DP9 | DP9 | |
| | ~ | | | | | | | | | | |
| | 638 | H | 598 | 697 | L | 697 | H | L | DP697 | DP697 | |
| | 639 | H | 599 | 698 | L | 698 | H | L | DP698 | DP698 | |
| | 640 | L | 599 | 698 | L | 698 | L | L | VBLK | VBLK | SUPPLEMENTARY IMAGE CFb |
| | ~ | | | | | | | | | | |
| | 699 | L | 599 | 698 | L | 698 | L | L | | VBLK | |

Fig. 11

CALCULATION OF VERTICAL TRAPEZOIDAL CORRECTION PARAMETERS

| | LAD | LADC1 | BLAD | OFFLAD | LADC2 | MLAD | DSPV | SELV | RV2 | RV3 |
|---|---|---|---|---|---|---|---|---|---|---|
| | 0 | L | 0 | 0 | L | 0 | L | L | VBLK | VBLK |
| SUPPLEMENTARY IMAGE CFb | 69 | L | 0 | 0 | L | 0 | L | L | VBLK | VBLK |
| | 70 | H | 0 | 0 | L | 0 | H | L | DL0 | DL0 |
| | 71 | H | 1 | 0 | L | 1 | H | L | DL1 | DL1 |
| | 72 | H | 2 | 1 | H | 3 | H | H | DL3 | (DL1+DL3)/2 |
| | 73 | H | 3 | 1 | L | 4 | H | L | DL4 | DL4 |
| TRAPEZOID IMAGE CFa | 74 | H | 4 | 1 | L | 5 | H | L | DL5 | DL5 |
| | 75 | H | 5 | 2 | L | 6 | H | L | DL6 | DL6 |
| | 76 | H | 6 | 2 | H | 8 | H | H | DL8 | (DL6+DL8)/2 |
| | 77 | H | 7 | 2 | L | 9 | H | L | DL9 | DL9 |
| | 296 | H | 226 | 51 | L | 277 | H | L | DL277 | DL277 |
| | 297 | H | 227 | 52 | H | 279 | H | H | DL279 | (DL277+DL279)/2 |
| | 298 | H | 228 | 52 | L | 280 | H | L | DL280 | DL280 |
| | 497 | H | 427 | 70 | L | 497 | H | L | DL497 | DL497 |
| | 498 | H | 428 | 70 | L | 498 | H | L | DL498 | DL498 |
| | 499 | H | 429 | 70 | L | 499 | H | L | DL499 | DL499 |

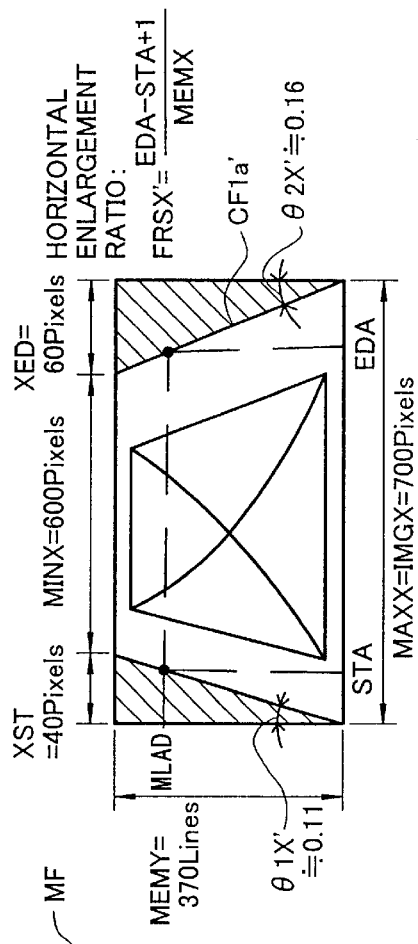
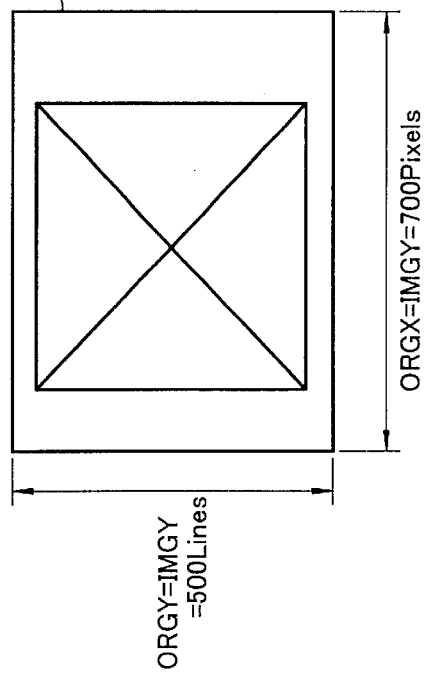
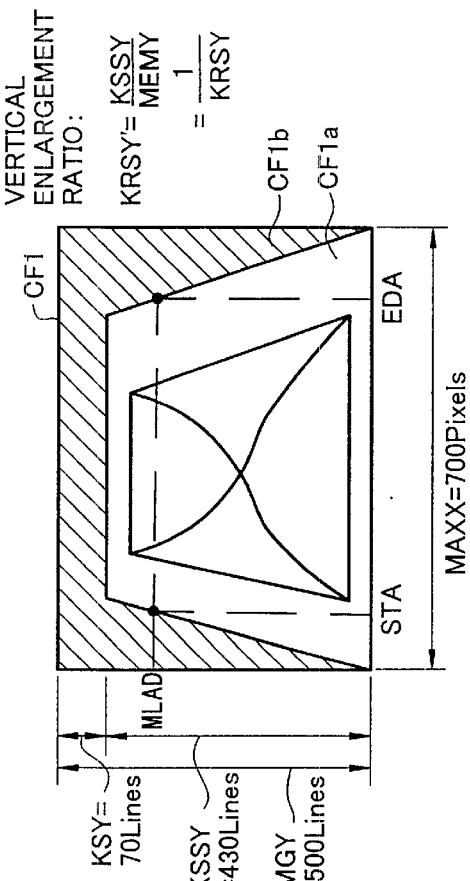
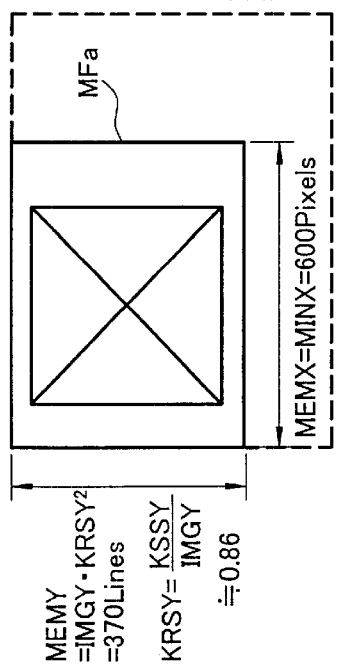
Fig. 13(A) ORIGINAL IMAGE
Fig. 13(B) REDUCED IMAGE IN FRAME MEMORY 120
Fig. 13(C) AFTER HORIZONTAL CORRECTION
Fig. 13(D) AFTER VERTICAL CORRECTION

Fig.14

CALCULATION OF TRAPEZOID CORRECTION PARAMETERS

| LAD | DSPV | BLAD* | MLAD* | STA | EDA | FRSX' |
|---|---|---|---|---|---|---|
| 0 | L | 0 | 0 | 40 | 639 | 1.000 |
| ⎰ | | | | | | |
| 69 | L | 0 | 0 | 40 | 639 | 1.000 |
| 70 | H | 0 | 0 | 40 | 639 | 1.000 |
| 71 | H | 1 | 1 | 40 | 639 | 1.001 |
| 72 | H | 2 | 2 | 40 | 639 | 1.001 |
| ⎰ | | | | | | |
| 79 | H | 9 | 7 | 39 | 640 | 1.004 |
| ⎰ | | | | | | |
| 99 | H | 29 | 23 | 37 | 643 | 1.012 |
| ⎰ | | | | | | |
| 149 | H | 79 | 62 | 33 | 650 | 1.031 |
| ⎰ | | | | | | |
| 199 | H | 129 | 102 | 28 | 657 | 1.050 |
| ⎰ | | | | | | |
| 249 | H | 179 | 142 | 23 | 664 | 1.070 |
| ⎰ | | | | | | |
| 299 | H | 229 | 184 | 19 | 671 | 1.089 |
| ⎰ | | | | | | |
| 399 | H | 329 | 273 | 9 | 685 | 1.128 |
| ⎰ | | | | | | |
| 499 | H | 429 | 369 | 0 | 699 | 1.167 |

Fig. 15  CALCULATION OF HORIZONTAL TRAPEZOIDAL CORRECTION PARAMETERS (FOR EACH PIXEL)

| | FRSX' | PAD | PADC1 | BPAD | RSPAD | PADC2 | MPAD | DSPH | SELH | RV1 | RV2 |
|---|---|---|---|---|---|---|---|---|---|---|---|
| SUPPLEMENTARY IMAGE CFb | | 0 | L | 0 | 0 | 0 | 0 | L | L | – | VBLK |
| | | ~ | | | | | | | | | |
| TRAPEZOID IMAGE CFa | 1.128 | 8 | L | 0 | 0 | 0 | 0 | L | L | – | VBLK |
| | | 9 | H | 0 | 0 | 0 | 0 | H | L | DP0 | DP0 |
| | | 10 | H | 1 | 1 | 1 | 1 | H | L | DP1 | DP1 |
| | | 11 | H | 2 | 2 | 2 | 2 | H | L | DP2 | DP2 |
| | | 12 | H | 3 | 3 | 3 | 3 | H | L | DP3 | DP3 |
| | | 13 | H | 4 | 4 | 4 | 4 | H | L | DP4 | DP4 |
| | | 14 | H | 5 | 4→5 | H→L | 5 | H | H→L | DP5 | (DP4+DP5)/2 |
| | | 15 | H | 6 | 5 | L | 5 | H | L | DP5 | DP5 |
| | | 16 | H | 7 | 6 | L | 6 | H | L | DP6 | DP6 |
| | | ~ | | | | | | | | | |
| | | 682 | H | 673 | 597 | L | 597 | H | L | DP597 | DP597 |
| | | 683 | H | 674 | 598 | L | 598 | H | L | DP598 | DP598 |
| | | 684 | H | 675 | 598→599 | L→H | 598→599 | H | H→L | DP599 | (DP598+DP599)/2 |
| | | 685 | H | 676 | 599 | L | 599 | H | L | DP599 | DP599 |
| | | 686 | L | 676 | 599 | L | 599 | L | L | – | VBLK |
| SUPPLEMENTARY IMAGE CFb | | 699 | L | | | | | L | L | – | VBLK |

Fig. 16

CALCULATION OF VERTICAL TRAPEZOIDAL CORRECTION PARAMETERS (FOR EACH LINE)

| | LAD | LADC1 | BLAD | OFFLAD | LADC2 | MLAD | DSPV | SELV | RV2 | RV3 |
|---|---|---|---|---|---|---|---|---|---|---|
| SUPPLEMENTARY IMAGE CFb | 0 | L | 0 | 0 | L | 0 | L | L | VBLK | VBLK |
| | 69 | L | 0 | 0 | L | 0 | L | L | VBLK | VBLK |
| TRAPEZOID IMAGE CFa | 70 | H | 0 | 0 | L | 0 | H | L | DL0 | DL0 |
| | 71 | H | 1 | 0 | L | 1 | H | L | DL1 | DL1 |
| | 72 | H | 2 | 0 | L | 2 | H | L | DL2 | DL2 |
| | 249 | H | 179 | 12 | L | 167 | H | L | DL167 | DL167 |
| | 250 | H | 180 | 12 | H | 168 | H | H | DL168 | D168 |
| | 251 | H | 181 | 13 | L | 169 | H | L | DL169 | (DL168+DL169)/2 |
| | 252 | H | 182 | 13 | L | 169 | H | L | DL169 | DL169 |
| | 494 | H | 424 | 59 | L | 365 | H | L | DL365 | DL365 |
| | 495 | H | 425 | 59 | L | 366 | H | L | DL366 | DL366 |
| | 496 | H | 426 | 59 | H | 367 | H | L | DL367 | DL367 |
| | 497 | H | 427 | 60 | L | 368 | H | H | DL368 | (DL367+DL368)/2 |
| | 498 | H | 428 | 60 | L | 368 | H | L | DL368 | DL368 |
| | 499 | H | 429 | 60 | L | 369 | H | L | DL369 | DL369 |

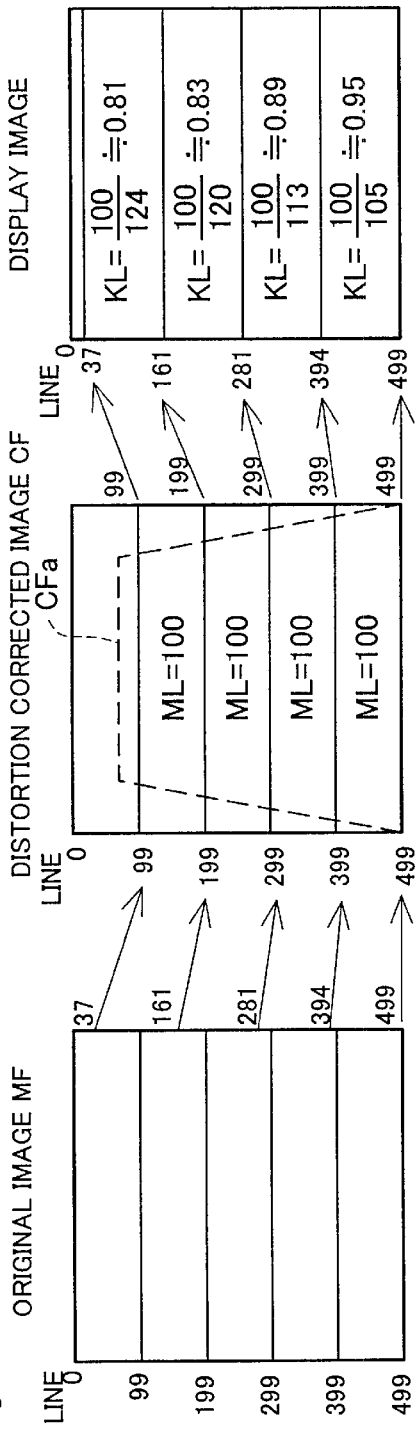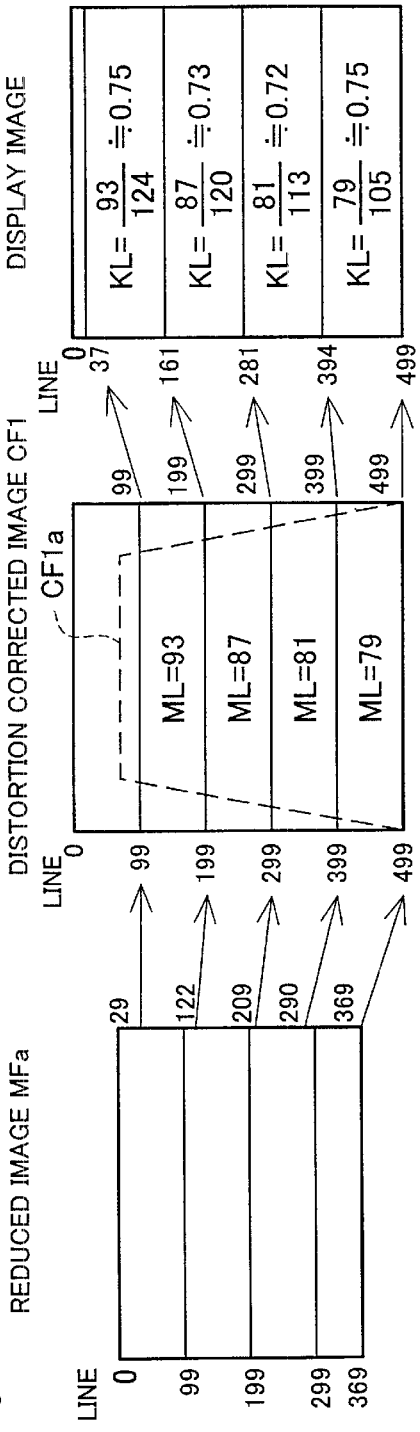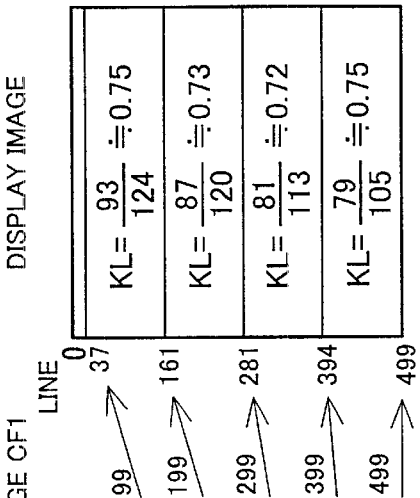

IMAGE PROCESSING DEVICE AND IMAGE PROCESSING METHOD

CROSS-REFERENCE TO A RELATED APPLICATION

This application is a continuation of PCT/JP99/00632, filed Feb. 12, 1999.

This application is related to Japanese Application No. 10-54530 filed on Feb. 18, 1998, the entire contents of which are incorporated by reference.

BACKGROUND OF THE INVENTION

1. Field of the Invention

The present invention relates to a technique for correcting distortion of an image caused by tilt projection of a projection-type image display apparatus.

2. Discussion of the Background

FIGS. 18(A)–18(D) are explanatory diagrams showing an image projection by a conventional projection-type display apparatus. Generally, a projection-type display apparatus 20 modulates incident light from a light source by a light modulating unit such as a liquid crystal light valve (liquid crystal panel). The modulated light emitted from the liquid crystal light valve passes through a projecting optical system and is projected on a screen 30. That is, such a projection-type display apparatus enlarges and displays the image displayed on the liquid crystal light valve onto the screen 30.

As shown in FIG. 18(A), if the projection-type display apparatus 20 is positioned so the optical axis 20c of the projection-type display apparatus 20 matches a normal line 30n of the center position of the screen 30, the image 32 projected on the screen 30 is an undistorted image (hereinafter referred to as a "normal image") similar to an image represented by image signals supplied to the liquid crystal light valve (FIG. 18(B)). However, such an arrangement is problematic if the projection-type display apparatus is situated between the user and the screen, since the projection-type display apparatus blocks the view of the user observing the projected image.

Now, a general arrangement is to position the projection-type display apparatus 20 at a position lower than that shown in FIG. 18(A) (a higher position will suffice as well) as shown in FIG. 18(C), so the angle θp between an optical axis 20c of the projection-type display apparatus 20 and the normal line 30n of the screen 30 (this being hereinafter referred to as "tilt angle") is more than 0 degrees. Image projection with a projection-type display apparatus positioned with such a certain tilt angle is generally referred to as "tilt projection." However, if the projection-type display apparatus is situated so as to perform tilt projection, an image 34 projected on the screen 30 is enlarged in the vertical upwards direction more than an image 32, as shown in FIG. 18(D). In addition, a trapezoid-shaped distortion (also called "keystone distortion" or "tilt distortion"), in which the image is enlarged horizontally at the upper edge, is generated. Hereinafter, the trapezoid-shaped image displayed on the screen will be referred to as a "distorted image." Incidentally, if the projection-type display apparatus is situated at a high position, a trapezoid-shaped distortion, in which the image is enlarged horizontally at the lower edge, is generated. The greater the tilt angle θp, the more this trapezoid distortion increases.

Such trapezoid distortion can be optically corrected by electrically processing the image. FIGS. 19(A) and 19(B) are explanatory diagrams showing a method for electrically processing the image to correct the trapezoid distortion. In FIG. 19(A), a lower edge of an image 34 (distorted image) projected on the screen 30 for tilt projection, and that of an image 32 (normal image) projected on the screen 30 for no tilt projection are positioned at the bottom of the figure. To remove the distortion in the distorted image 34 and obtain an image 34' similar to the normal image 32 (FIG. 19(B)), image signals should be provided to the liquid crystal light valve so the image projected on the screen 30 would be the corrected image 32' shown by dotted lines in FIG. 19(B) if there is no tilt projection. That is, image signals representing the image portion 32'a, which is distorted in an opposite form as the distorted image 34, are to be applied to the liquid crystal light valve. Incidentally, hereinafter, the image portion 32'a will be referred to as an "effective image portion," and the other image portions 32'b (hatched) will be referred to as a "non-effective image portion."

The liquid crystal light valve has a plurality of pixels arrayed in a two-dimensional manner and pixel signals representing the image to be projected are input to each pixel, thus modulating the incident light. Accordingly, there is the need to provide pixel signals to all of the pixels in the liquid crystal light valve. To this end, of the corrected image 32', pixel signals representing the image to be displayed are provided to the pixels of the liquid crystal light valve corresponding to the effective image portion 32'a. In addition, pixel signals representing black are provided to the non-effective image portion 32'b so as to obtain an area where nothing is displayed. For tilt projection, providing the pixel signals representing the corrected image 32' to the liquid crystal light valve allows the image projected on the screen 30 to not be the distorted image 34, but the undistorted image (normal image) 34' is approximately similar to the image 32.

An example of such a correction method is described in Japanese Unexamined Patent Publication No. 8-98119. According to this correction method, the effective image portion 32'a of the corrected image 32' and the non-effective image portion 32'b thereof are obtained from the relationship between the position of an arbitrary pixel FP' in the image 34' projected on the screen 30 (FIG. 19(B)) and the position of a corresponding pixel FP (FIG. 19(B)) in the corrected image 32', as a function of the tilt angle θp. Incidentally, the relationship between the position of the arbitrary pixel FP' in the image 34' and the position of the corresponding pixel FP in the corrected image 32' is shown with the following expressions:

$$Yb = Vn \cdot \frac{\sin\left[\frac{\pi}{2} + \tan^{-1}\left(\frac{Vn - \frac{Vm}{2}}{L}\right)\right]}{\sin\left[\frac{\pi}{2} - \theta p - \tan^{-1}\left(\frac{Vn - \frac{Vm}{2}}{L}\right)\right]} \quad (1a)$$

$$Xb = hn \cdot \frac{L + Yb \cdot \sin\theta p}{L} \quad (1b)$$

The parameter Yb represents a distance in the vertical direction from the lower edge of the projected image 34' to the position of the pixel FP'. The parameter Xb represents a distance in the horizontal direction from the left edge of the projected image 34' to the position of the pixel FP'. The parameter Vn represents a distance in the vertical direction from the lower edge of the corrected image 32' to the position of the pixel FP. The parameter hn represents a distance in the horizontal direction from the left edge of the corrected image 32' to the position of the pixel FP. In addition, the parameter Vm represents a distance between the lower edge and upper edge of the effective image portion 32'b within the corrected image 32'. The parameter L represents a distance from the projection lens of the projection-type display apparatus 20 to the screen 30. The parameter θp represents the tilt angle in the vertical direction (i.e., the angle in the vertical direction between the optical axis 20c of the projection-type display apparatus 20 and the normal line 30n of the screen 30).

From the above Expressions (1a) and (1b), a determination can be made regarding to which pixels of the liquid crystal light valve the pixel signals for each pixel in the image 34' should be provided in the event of projecting an image 34' free of trapezoid distortion on the screen 30 while performing vertical tilt projection.

The above background example illustrates an example in which the optical axis 20c of the projection-type display apparatus 20 and the normal line 30n of the screen 30 match within a horizontal plane, and the optical axis 20c of the projection-type display apparatus 20 and the normal line 30n of the screen 30 do not match within a vertical plane so there is a tilt angle θp, (i.e., in the case in which horizontally symmetrical trapezoid distortion occurs). However, in reality, when the optical axis 20c of the projection-type display apparatus 20 and the normal line 30n of the screen 30 do not match within a vertical plane, there are cases in which the projection-type display apparatus 20 is also tilted horizontally to the screen 30. In such cases, the trapezoid distortion is non-symmetrical in the horizontal direction, and the technique according to the above background example cannot correct distortion well.

Also, the above Expressions (1a) and (1b) depend on the distance L between the projection-type display apparatus 20 (projection lens) and the screen 30, in addition to the vertical tilt angle θp. However, the distance L is a parameter which varies according to the environment of use. To use the above Expressions (1a) and (1b), the distance L has to be obtained and set for each environment of use, so it is difficult in actual practice to use the Expressions (1a) and (1b) to suitably correct trapezoid distortion.

SUMMARY OF THE INVENTION

Accordingly, an object of the present invention is to provide a technique to readily correct image distortion due to the tilt projection of an image onto a screen.

To solve the above-noted and other problems, the present invention provides a first image processing device configured to process an image to be formed at an image forming section of a projection-type display apparatus, which projects and displays on a screen an image formed at the image forming section. The image processing device includes an image correction section that produces a distortion-corrected image obtained by correcting a shape of an original image and that supplies the distortion-corrected image to the image forming section, to correct distortion in the displayed image caused when an undistorted original image formed at the image forming section is subjected to tilt projection onto the screen.

The image correction section includes a first correction section which determines a display pixel range between a display start position and a display end position of the distortion corrected image on each horizontal line of the image forming section, based on horizontal correction parameters representing distortion-correction amounts at left- and right-sides of the distortion-corrected image, which determines a first relationship between each pixel within the display pixel range and each pixel in the original image based on a relationship between the number of pixels in the display pixel range and the number of pixels in one line in the original image, and which produces the distortion-corrected image from the original image according to the first relation.

According to the first image processing device of the present invention, image distortion in the horizontal direction can be easily corrected based on horizontal correction parameters representing the amount of correction on the left side and right side of the distortion corrected image. The image forming section is not limited to an image display such as a CRT, but includes a light modulating mechanism such as light valves and spatial light modulating devices. Liquid crystal panels are an example of a light valve. An example of spatial light modulating devices is a device utilizing reflection from mirror elements arrayed as pixels.

It is preferable the horizontal correction parameters include at least two parameters representing the distortion correction amounts at the left- and right-sides of the distortion-corrected image, and in which the distortion correction amounts at the left- and right-sides can be independently set.

The independent settings of the distortion correction amounts at the left- and right-sides of the distortion corrected image allows easy correction even when the image distortion is horizontally non-symmetrical.

Also, it is preferable the first correction section includes a pixel filter processor for performing interpolation filtering, based on the original image, to pixels within the display pixel range of the distortion-corrected image.

According to the above configuration, image deterioration due to the absence of skipped pixels can be relieved.

It is also preferable the image correction section further includes a second correction section which determines a display line range between a display start line and a display end line of the distortion corrected image on the image forming section, based on vertical correction parameters representing distortion-correction amounts in the vertical direction of the distortion-corrected image, which determines a second relationship between each line within the display line range and each line in the original image, and which produces the distortion-corrected image from the original image according to the second relationship.

According to this configuration, image distortion in the vertical direction can be easily corrected by appropriate settings of vertical correction parameters.

It is preferable the second relationship is determined based on a height of a substantially trapezoid-shaped effective image portion in the distortion-corrected image and a height of the original image, and in which the second relationship represents that the number of lines in the original image corresponding to a specific line in the effective image portion is greater as the specific line comes closer to the smaller base of the substantially trapezoid-shaped form, and that the number of lines in the original image corresponding to a specific line in the effective image portion decreases as the specific line comes closer to the larger base of the substantially trapezoid-shaped form. This allows the second relationship to be easily determined.

The second relationship can be determined by the following expression:

$$MLAD = \frac{1}{RSY} \cdot \left[ \{LAD - (IMGY - KSSY)\} + (IMGY - KSSY) \cdot \sin\left\{ \frac{\pi}{2} \cdot \frac{LAD - (IMGY - KSSY)}{KSSY - 1} \right\} \right] \quad (2)$$

where MLAD represents a line position in the original image, RSY represents a ratio of a height of the display image area to a height of the original image, LAD represents a line position in the display line range, IMGY represents a height of the original image, and KSSY represents a height of the substantially trapezoid-shaped effective image portion.

Also, it is preferable the second correction section includes a line filter processor for performing interpolation filter processing, based on the original image, to lines within the display line range of the distortion-corrected image.

Thus, image deterioration due to the absence of skipped lines can be relieved.

The second image processing device according to the present invention is an image processing device configured to process an image to be formed at an image forming section of a projection-type display apparatus, which projects and displays on a screen an image formed at the image forming section. The image processing device includes an image correction section that produces a distortion-corrected image which is obtained by correcting a shape of an original image and that supplies the distortion-corrected image to the image forming section, to correct distortion in the displayed image caused when an undistorted original image formed at the image forming section is subjected to tilt projection onto the screen. The image correction section includes a reducing section that reduces the original image to produce a reduced image, and a horizontal correction section that enlarges each horizontal line in the reduced image by an enlargement ratio of at least 1, which depends on horizontal correction parameters representing distortion correction amounts of left- and right-sides of the distortion-corrected image and on a position of each horizontal line, and that produces a distortion-corrected image for correcting the left- and right-side distortion.

According to the second image processing device, image distortion in the horizontal direction can be easily corrected based on horizontal correction parameters representing the amount of correction on the left- and right-sides of the distortion corrected image. Further, a distortion corrected image can be produced by enlarging the reduced image by a ratio of one or greater, so the resolution of the distortion corrected image in the horizontal direction can be made to be approximately constant.

A horizontal width of the reduced image may be equal to a minimum horizontal width of the substantially trapezoid-shaped effective image portion in the distortion-corrected image.

It is preferable the horizontal correction parameters include at least two parameters representing the distortion correction amounts at the left- and right-sides of the distortion-corrected image, and in which the distortion correction amounts at the left- and right-sides can be independently set.

The independent settings of the distortion correction amounts at the left- and right-sides of the distortion corrected image allows easy correction even when the image distortion is horizontally non-symmetrical.

Also, it is preferable the horizontal correction section includes a pixel filter processor for performing interpolation filter processing, based on the reduced image, to pixels within the display pixel range of the distortion-corrected image.

According to the above configuration, image deterioration due to the absence of skipped pixels can be relieved.

Also, it is preferable a height in the vertical direction of the reduced image is equal to or less than a height in the vertical direction of the substantially trapezoid-shaped effective image portion in the distortion-corrected image, and the image correction section further includes a vertical correction section which determines a display line range between a display start line and a display end line of the distortion-corrected image at the image forming section, based on vertical correction parameters representing distortion-correction amounts in the vertical direction of the distortion-corrected image, which determines a relationship between each line within the display line range and each line in the reduced image, and which enlarges the reduced image based on the relation to produce the distortion-corrected image.

According to this configuration, image distortion in the vertical direction can be easily corrected by appropriate settings of vertical correction parameters. Further, a distortion corrected image can be produced by enlarging the reduced image based on the relationship of each line within the display line range and each line of the reduced image, so the resolution of the distortion corrected image in the vertical direction can be made to be approximately constant.

The relationship may be determined to adjust a vertical enlargement ratio from the reduced image to the distortion-corrected image at each vertical direction position so the substantially trapezoid-shaped effective image portion in the distortion-corrected image is enlarged from the reduced image so as to compensate for vertical distortion in the displayed image caused when an undistorted original image formed at the image forming section is subjected to tilt projection onto the screen.

Particularly, it is preferable the relationship is determined based on a height of a substantially trapezoid-shaped effective image portion in the distortion-corrected image and a height of the reduced image, and in which the relationship represents that the substantial number of lines in the original image corresponding to a specific line in the effective image portion is greater as the specific line comes closer to the smaller base of the substantially trapezoid-shaped form, and that the substantial number of lines in the original image corresponding to a specific line in the effective image portion decreases as the specific line comes closer to the larger base of the substantially trapezoid-shaped form.

Such an arrangement allows easy determination of the relationship.

The above relation can be determined by the following expression:

$$MLAD = \{LAD - (IMGY - KSSY)\} - (KSSY - MEMY) \cdot \left[ 1 - \sin\left\{ \frac{\pi}{2} \cdot \frac{KSSY - (LAD - (IMGY - KSSY))}{KSSY - 1} \right\} \right] \quad (3)$$

where MLAD represents a line position in the original image, LAD represents a line position in the display line range, IMGY represents a height of the original image, KSSY represents a height of the substantially trapezoid-shaped effective image portion, and MEMY represents a height of the reduced image.

A first image processing method according to the present invention is an image processing method of processing an image to be formed at an image forming section of a projection-type display apparatus, which projects and displays on a screen an image formed at the image forming section. The method includes an image correction step of producing a distortion-corrected image obtained by correcting a shape of an original image and supplying the distortion-corrected image to the image forming section, to correct distortion in the displayed image caused when an undistorted original image formed at the image forming section is subjected to tilt projection onto the screen. The image correction step includes a first correction step of determining a display pixel range between a display start position and a display end position of the distortion corrected image on each horizontal line of the image forming section, based on horizontal correction parameters representing distortion-correction amounts at left- and right-sides of the distortion-corrected image, determining a first relationship between each pixel within the display pixel range and each pixel in the original image based on a relationship between the number of pixels in the display pixel range and the number of pixels in one line in the original image, and producing the distortion-corrected image from the original image according to the first relation.

A second image processing method according to the present invention is an image processing method of processing an image to be formed at an image forming section of a projection-type display apparatus, which projects and displays on a screen an image formed at the image forming section. The method includes an image correction step of producing a distortion-corrected image obtained by correcting a shape of an original image and supplies the distortion-corrected image to the image forming section, to correct distortion in the displayed image caused when an undistorted original image formed at the image forming section is subjected to tilt projection onto the screen. The image correction step includes a reduction step of reducing the original image to produce a reduced image and a horizontal correction step of enlarging each horizontal line in the reduced image by an enlargement ratio of at least 1 which depends on horizontal correction parameters representing distortion correction amounts of left- and right-sides of the distortion-corrected image and on a position of each horizontal line, and producing a distortion-corrected image for correcting the left- and right-side distortion.

According to the first and second image processing methods of the present invention, operation and advantages similar to those of the above image processing device can be attained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7(A)–7(C) are explanatory diagrams showing the procedures for distortion correction processing;

FIG. 8 is an explanatory diagram showing parameters calculated for each line in the vertical direction, of the various parameters related to the operations of a horizontal correction control circuit and the a pixel address generating circuit;

FIG. 9 is an explanatory diagram showing an example in which the line address LAD=70 regarding parameters calculated for each pixel in a line, out of the various parameters regarding the operation of the horizontal correction control circuit and the pixel address generating circuit;

FIG. 11 is an explanatory diagram showing the various parameters relating to the operation of a vertical correction control circuit and line address generating circuit;

FIGS. 13(A)–13(D) are explanatory diagrams showing the procedures of distortion correction processing according to a second embodiment;

FIG. 14 is an explanatory diagram showing the parameters calculated for each line in the vertical direction, of the various parameters relating to the operation of the horizontal correction control circuit and the pixel address generating circuit;

FIG. 15 is an explanatory diagram showing an example of a case regarding parameters calculated for each pixel within a line, of the various parameters relating to the operation of the horizontal correction control circuit and the pixel address generating circuit, in which the line address LAD=549;

FIG. 16 is an explanatory diagram showing the various parameters relating to the operation of the vertical correction control circuit and line address generating circuit;

FIGS. 17(A-1)–17(A-3) and 17(B-1)–17(B-3) are explanatory diagrams noting the relationship between the distortion corrected image CF and the projected display image in the vertical direction;

DESCRIPTION OF THE PREFERRED EMBODIMENTS

Figure 1:
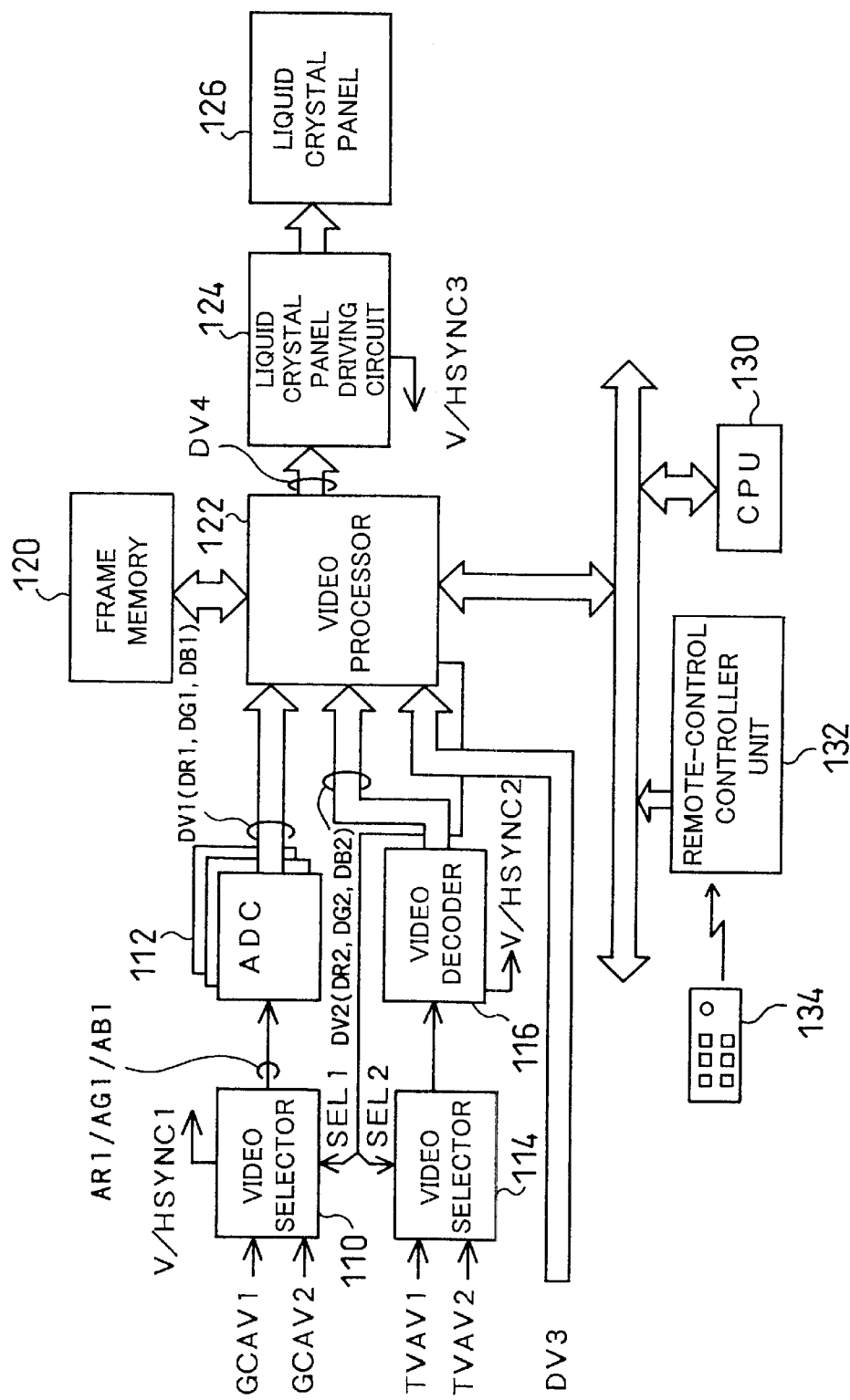
FIG. 1 is a block diagram showing an overall configuration of an image processing device as a first embodiment of the present invention.

Referring now to the drawings, wherein like reference numerals designate identical or corresponding parts throughout the several views, the first and second embodiments will be described.

A. First Embodiment

A-1. Overall Configuration of the Image Processing Device

FIG. 1 is a block diagram showing the overall configuration of an image processing device as a first embodiment of the present invention. The image processing device 100 is a computer system including a first video selector 110, A/D converter 112, second video selector 114, video decoder 116, frame memory 120, video processor 122, liquid crystal panel driving circuit 124, liquid crystal panel 126, CPU 130, and remote-control controller unit 132.

The image processing device 100 is provided within a liquid crystal projector (liquid crystal projection-type display apparatus), and is a device for processing an image to be formed on the liquid crystal panel 126. The image formed on the liquid crystal panel 126 is projected onto a projection screen using an unshown optical system.

Provided to the first video selector 110 are multiple image signals GCAV1 and GCAV2 which have been output from a personal computer, and one of these is selectively output according to a selection signal SEL1 provided from the video processor 122. The image signals output from the first video selector include analog image signals AR1, AG1, and AB1, for the three colors red (R), green (G), and blue (B); horizontal synchronizing signal HSYNC1; and vertical synchronizing signal VSYNC1. Such image signals are referred to as component image signals.

The AD converter 112 converts the analog image signals AR1, AG1, and AB1 output from the first video selector 110 into respective digital image signals DR1, DG1, and DB1, with the three AD converting circuits within the AD converter 112. These digital image signals DR1, DG1, and DB1 are collectively referred to as digital image signal DV1.

Provided to the second video selector 114 are multiple video signals TVAV1 and TVAV2 which have been output from a video recorder or television set or the like, and one of these is selectively output according to a selection signal SEL2 provided from the video processor 122. These video signals are image signals in which brightness signals, color signals, and synchronizing signals have been combined, and are referred to as composite image signals.

The video recorder 116 separates a horizontal synchronizing signal HSYNC2 and vertical synchronizing signal VSYNC2 from the composite image signal provided from the second video selector 110, and also converts the three components R, G, and B, into digital image signals DR2, DG2, and DB2. These digital image signals DR2, DG2, and DB2 are collectively referred to as digital image signal DV2.

The video processor 122 is a processor for writing and adding images to and from the frame memory 120, and has functions for enlarging and reducing the image, correcting keystone distortion (trapezoid distortion), and adjusting image display. The details of the internal configuration and functions of the video processor 122 will be described later. In addition to the digital image signal DV1 provided from the AD converter 112 and digital image signal DV2 provided from the video decoder 116, digital image signals DV3 can also be provided to the video processor 122 from the CPU 130 via a bus.

Digital image signals DV4 read from the frame memory 120 and processed by the video processor 122 are supplied to the liquid crystal panel driving circuit 124. An image is formed at the liquid crystal panel 126 according to the digital image signal DV4. Also, the liquid crystal panel driving circuit 124 generates vertical synchronizing signal VSYNC3 and horizontal synchronizing signal HSYNC3 for image formation and outputs these to other circuitry. The circuit for generating the vertical synchronizing signal VSYNC3 and horizontal synchronizing signal HSYNC3 does not need to be the liquid crystal panel driving circuit 124, generating thereof may be performed at other circuits. For example, this may be provided to the video processor 122. Incidentally, the liquid crystal panel 126 corresponds to the image forming section of the present invention.

Reading of the image signals from the frame memory 120 and processing of the read image signals are performed synchronously with the synchronous signals VSYNC3 and HSYNC3 output from the liquid crystal panel driving circuit 124. On the other hand, sampling at the above-described AD converter 112 and processing for writing image signals to the frame memory 120 are performed synchronously with the synchronous signals VSYNC1 and HSYNC1 output from the first video selector or the synchronous signals VSYNC2 and HSYNC2 output from the video decoder 116. The first synchronous signals VSYNC1 and HSYNC1, second synchronous signals VSYNC2 and HSYNC2, and third synchronous signals VSYNC3 and HSYNC3 are mutually asynchronous. Of course, mutually synchronous signals can be used as the first synchronous signals VSYNC1 and HSYNC1 and third synchronous signals VSYNC3 and HSYNC3. Also, mutually synchronous signals can be used as the second synchronous signals VSYNC2 and HSYNC2 and third synchronous signals VSYNC3 and HSYNC3.

The remote-control controller unit 132 controls the functions of each part of the projection-type display apparatus, based on commands from the remote-control 134. For example, setting of the various parameters for the later-described image adjustment, trapezoid distortion correction, etc., is performed based on commands from the remote-control 29, thereby controlling the functions of each part.

A-2. Internal Configuration of the Video Processor 122

Figure 2:
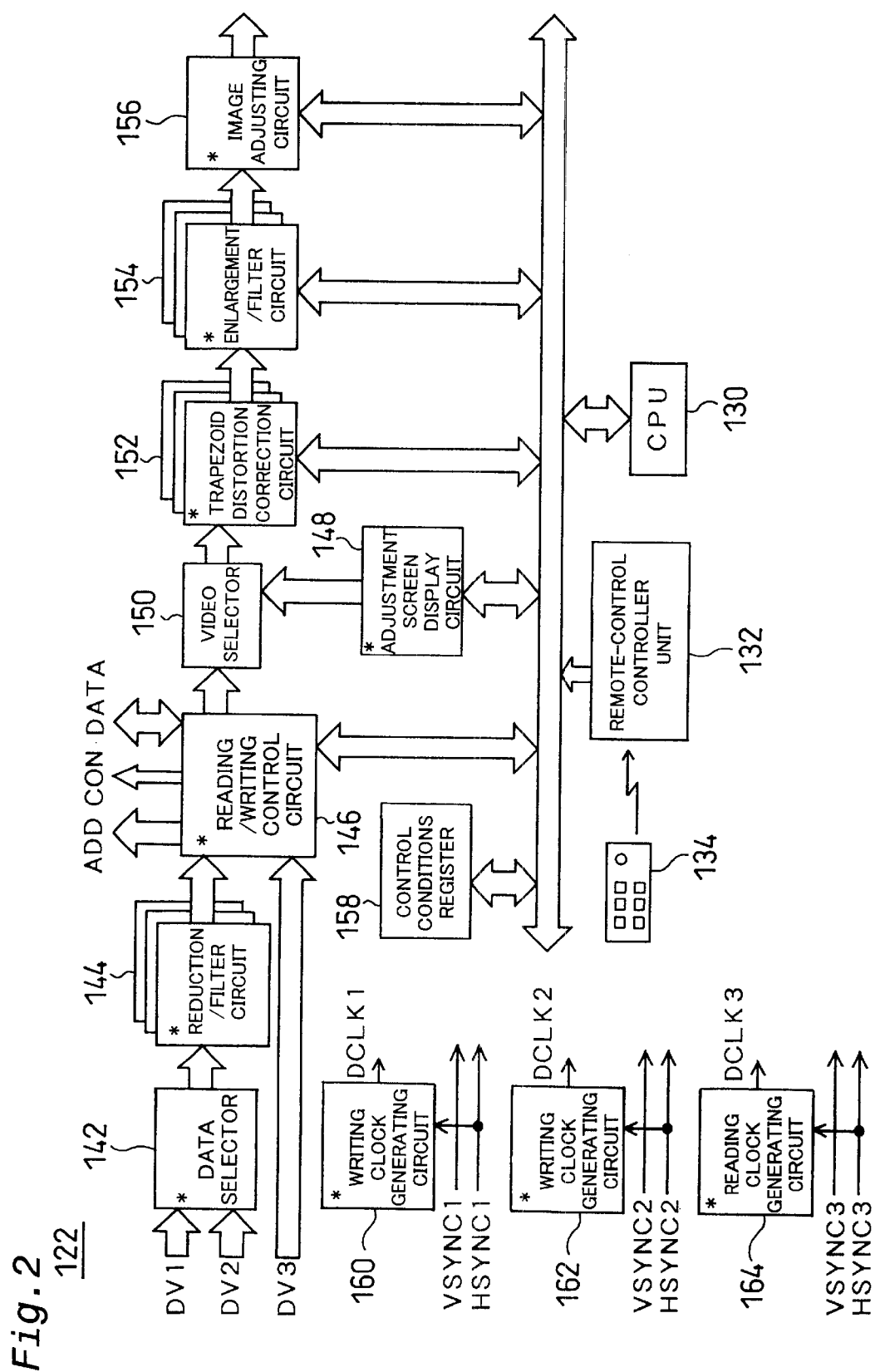
FIG. 2 is a block diagram showing a configuration of a video processor.

FIG. 2 is a block diagram showing the configuration of the video processor 122. The video processor 122 includes a data selector 142, reduction/filter circuit 144, reading/writing control circuit 146, adjustment screen display circuit 148, video selector 150, trapezoid distortion correction circuit 152, enlargement/filter circuit 154, image adjusting circuit 156, control conditions register 158, first writing clock generating circuit 160, second writing clock generating circuit 162, and reading clock generating circuit 164.

The data selector circuit 142 selects one of either the digital image signal DV1 provided from the A/D converter 112 and the digital image signal DV2 provided from the video decoder 116, and outputs the selected one. The selection signal provided to the data selector 142 is supplied from the CPU 130.

The reduction/filter circuit 144 reduces the image written to the frame memory 120 (FIG. 1) in the vertical and horizontal directions, and also performs filtering processing regarding line dropout and pixel dropout at the time of reduction. For example, if the image of the supplied digital image signals (image data) DV1 and DV2 is greater than the area at which image formation is possible on the liquid crystal panel 126 (FIG. 1), or if the image is to be formed in a certain area within the area at which image formation is possible on the liquid crystal panel 126, and so forth, reduction processing of image data input to the reduction/filter circuit 144 is executed.

The reading/writing control circuit 146 has capabilities for generating memory addresses and control signals for writing image signals to the frame memory 120 or reading from the frame memory 120.

The digital image signal read from the frame memory 120 is input to the third video selector 150. The third video selector 150 is also supplied with another digital image signal. The adjustment screen display circuit 148 generates digital image signals representing a menu screen for the user to adjust the display state (e.g., brightness, contrast, sync, tracking, color concentration, hue) of the image formed on the liquid crystal panel 126 (FIG. 1). The third video selector 150 outputs while switching the two input digital image signals according to the selection signals supplied from the adjustment screen display circuit 148. Consequently, digital image signals representing a combined image in which a menu screen is superimposed within the image shown by digital image signals read from the frame memory 120 are output from the third video selector 150. The size of the menu screen is adjusted according to the size of the image represented by the digital image signals read from the frame memory 120 and then output.

The trapezoid distortion correction circuit 152 provides the image shown by the image signals (image data) output from the video selector 150 with distortion reverse to the trapezoid distortion generated by tilt projection, so as to correct the trapezoid distortion generated when performing tilt projection. The internal configuration and operation of the trapezoid distortion correction circuit 152 will be described later.

The enlargement/filter circuit 154 enlarges the image represented by the image data output from the trapezoid distortion correction circuit 152 in the vertical and horizontal directions so the image corresponds with the display resolution of the liquid crystal display panel, and also performs filtering processing regarding line adding and pixel adding at the time of enlarging. For example, if the image shown by the image data output from the third video selector 150 is smaller than the area at which image formation is possible on the liquid crystal panel 126 (FIG. 1), enlargement processing of image data input to the enlargement/filter circuit 154 is executed.

The image adjusting circuit 156 adjust the image signals supplied from the enlargement/filter circuit 154 so the display state is according to that set by the user following the menu screen displayed by the adjustment screen display circuit 148.

The control conditions register 158 stores various conditions for writing image signals to the frame memory 120 or reading from the frame memory 120. These conditions are set by the CPU 130 via a bus. In FIG. 2, the blocks marked with a "*" execute their respective processes according to the conditions set in the control conditions register 158. That is, conditions set in the control conditions register include selection by the data selector 142 and first and second video selectors 110 and 114 (FIG. 1); reduction parameters for the reduction/filter circuit 144 (e.g., ratio of reduction); enlargement parameters for the enlarging/filter circuit 154 (e.g., ratio of enlargement); distortion correction parameters at the trapezoid distortion correction circuit 152 (e.g., tilt angle); read/write start position in the frame memory 120; adjustment parameters for the image adjusting circuit 156; and so forth.

The first writing clock generating circuit 160 generates dot clock signals DCLK1 from the horizontal synchronizing signal HSYNC1 supplied from the video selector 110 (FIG. 1). Also, the second writing clock generating circuit 162 generates dot clock signals DCLK2 from the horizontal synchronizing signal HSYNC2 supplied from the video decoder 116 (FIG. 1). The first and second writing clock generating circuits 160 and 162, and the reading clock generating circuit 164 have unshown PLL circuits. The dividing ratio at these PLL circuits is provided from the control conditions register 158. The writing processing of the reading/writing control circuit 146 shown in FIG. 2 is executed synchronously with synchronizing signals VSYNC1 and HSYNC1, or synchronously with dot clock signals DCLK2 and synchronizing signals VSYNC2 and HSYNC2.

The reading clock generating circuit 164 generates dot clock signals DCLK3 from the horizontal synchronizing signal HSYNC3 supplied from the liquid crystal panel driving circuit 124. The reading clock generating circuit 164 also has an unshown PLL circuit. The dividing ratio at this PLL circuit is also provided from the control conditions register 158. The writing processing of the reading/writing control circuit 146 shown in FIG. 2 is executed synchronously with the dot clock signals DCLK3 and synchronizing signals VSYNC3 and HSYNC3.

Figure 3:
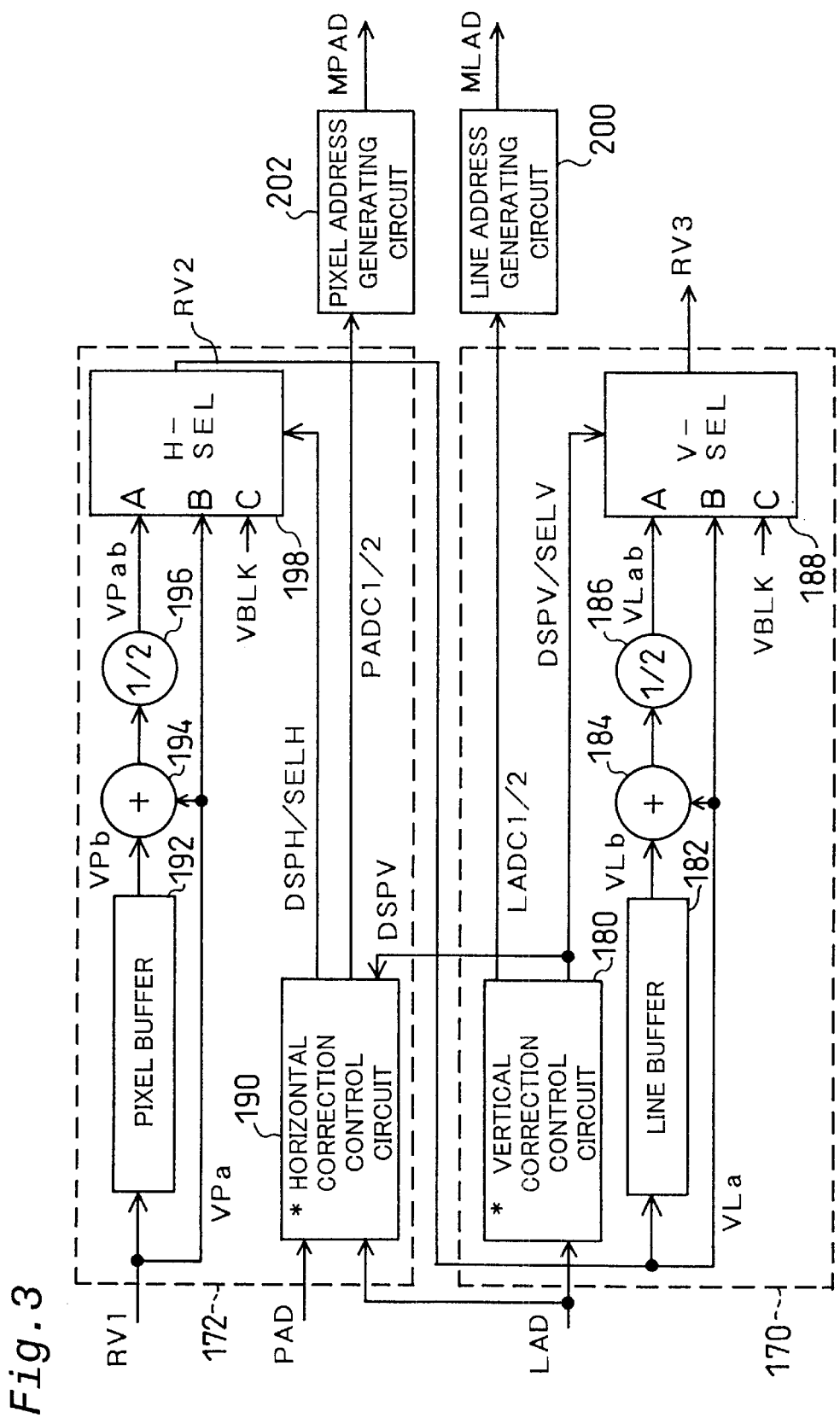
FIG. 3 is a block diagram showing an internal configuration of a trapezoid distortion correction circuit.

FIG. 3 is a block diagram showing the internal configuration of the trapezoid distortion correction circuit 152. The trapezoid distortion correction circuit 152 has a vertical correcting circuit 170 and a horizontal correcting circuit 172. The line address generating circuit 200 and pixel address generating circuit 202 shown in FIG. 3 are circuits included in the reading/writing control circuit 146 shown in FIG. 2.

The vertical correcting circuit 170 has a vertical correction control circuit 180, line buffer 182, adder 184, multiplier 186, and selector 188. The horizontal correcting circuit 172 is also of similar configuration to the vertical correcting circuit 170, and has a horizontal correction control circuit 190, pixel buffer 192, adder 194, multiplier 196, and selector 198. It should be noted, however, that while the line buffer 182 of the vertical correcting circuit 170 has capacity for storing image signals for one line, the pixel buffer 192 of the horizontal correcting circuit 172 has capacity for storing image signals for one pixel. The line buffer 182 is a delaying circuit for outputting input pixels signals in a manner delayed by one line.

A-3. Overview of a Distortion-corrected Image and Setting Correction Parameters

Figure 4A:
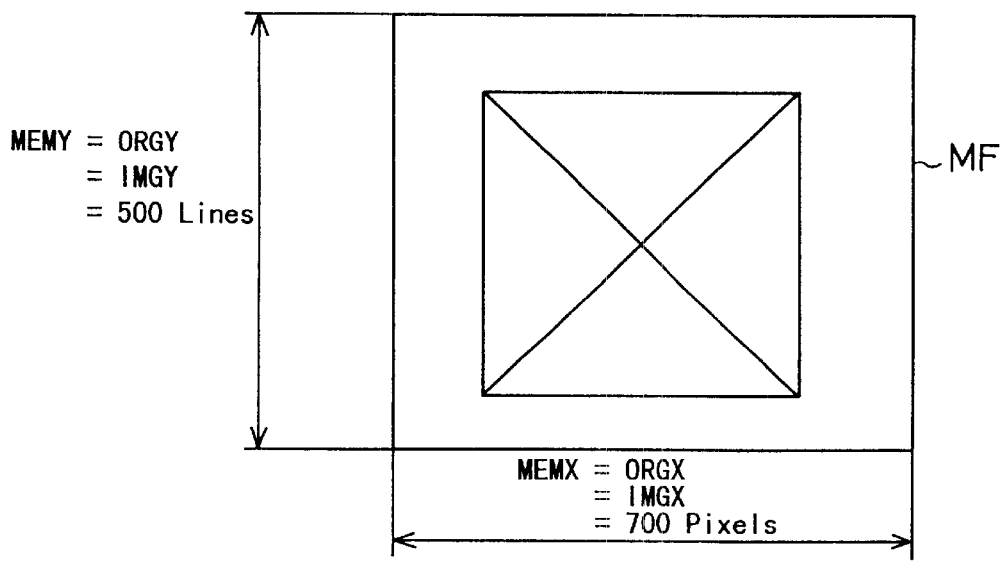
FIGS. 4(A) and 4(B) are explanatory diagrams showing an example of the original image MF written to a frame memory, display image area IF representing the size of the image to be provided to a liquid crystal panel, and a distortion-corrected image CF corrected by the trapezoid distortion correction circuit and actually provided to the liquid crystal panel.
Figure 4B:
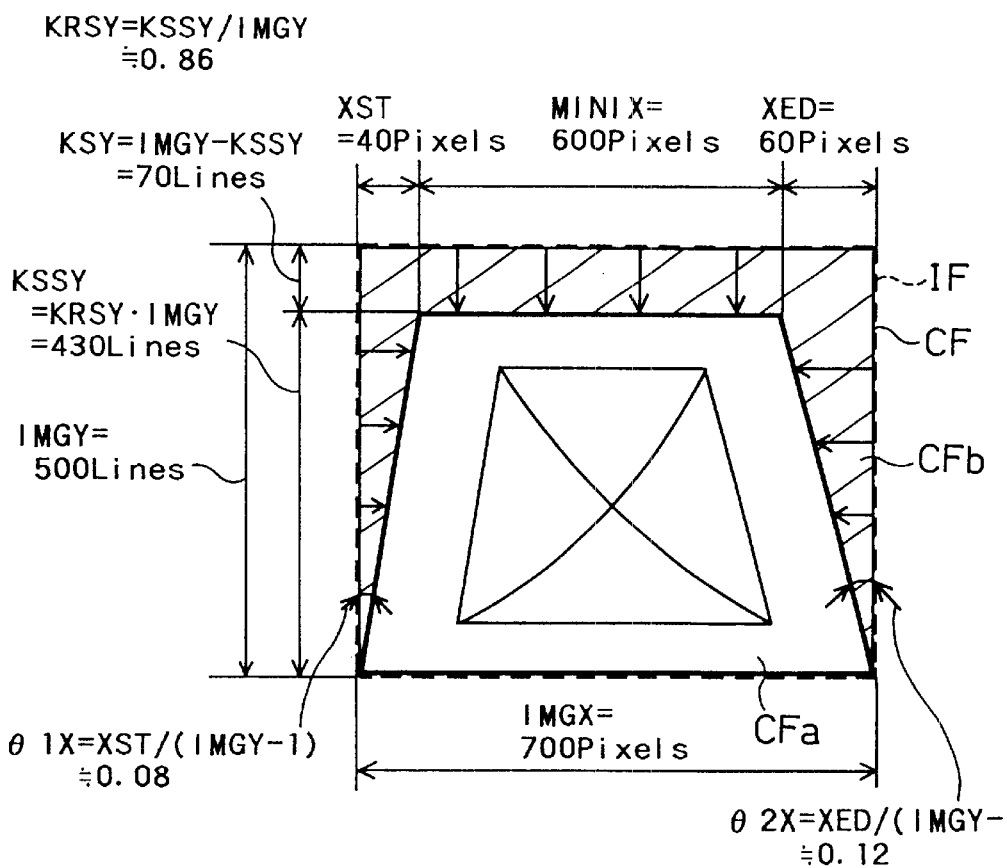

FIGS. 4(A) and 4(B) are explanatory diagrams showing the examples of an original image MF written to the frame memory 120, display image area IF indicating the size of the image to be provided to the liquid crystal panel 126 (FIG. 1), and the distortion corrected image CF corrected by the trapezoid distortion correction circuit 152 and actually provided to the liquid crystal panel 126.

The original image MF has a resolution of vertical lines ORGY of 500 and horizontal pixels ORGX of 700, and is written to the frame memory 120 as an image having this resolution, as shown in FIG. 4(A). That is, the original image MF written to the frame memory 120 is an image having a resolution of vertical lines MEMY of 500 and horizontal pixels MEMX of 700. The display image area IF shown by broken lines in FIG. 4(B) is also an image having a resolution of vertical lines IMGY of 500 and horizontal pixels IMGX of 700. Accordingly, FIGS. 4(A) and 4(B) illustrate an example in which the enlargement/reduction ratio between the original image MF and the image within the display image area IF is of equal magnification, i.e., the vertical enlargement/reduction ratio is 1, and the horizontal enlargement/reduction ratio is also 1.

The distortion corrected image CF is a rectangle-shaped image formed within the display image area IF, and has a trapezoid image portion CFa equivalent to the original image MF, and a supplementary image portion CFb for displaying nothing on the screen. The image data of each of the pixels within the supplementary image portion CFb is set at black level. The supplementary image portion CFb cannot be observed on the screen, so the trapezoid image portion CFa can be called the distortion corrected image by narrow definition.

The upper part of the trapezoid image portion CFa includes KSY (=IMGY−KSSY) lines below the upper edge of the display image area IF. This value KSY is determined according to the vertical correction rate KRSY (=KSSY/ IMGY). Here, KSSY is the number of vertical lines in the trapezoid image portion CFa and IMGY is the number of vertical lines in the display image area IF. The left part of the trapezoid image portion CFa is inclined inwards by an inclination of θ1X to the left edge of the display image area IF with reference to the lower left point, and the right part is inclined inwards by an inclination of θ2X to the right edge of the display image area IF with reference to the lower right point. XST in FIG. 4(B) represents the number of pixels of the left part of the supplementary image portion CFb on that line of the distortion corrected image CF which includes the upper edge of the trapezoid image portion CFa (hereafter referred to as "number of upper left supplementary pixels"). XED represents the number of pixels of the right part of the supplementary image portion CFb on that line of the distortion corrected image CF which includes the upper edge of the trapezoid image portion CFa (hereafter referred to as "number of upper right supplementary pixels"). Incidentally, in the later-described computation, the values used for the inclinations θ1X and θ2X are not XST/(KSSY−1) and XED/(KSSY−1) which are values of the image corrected in the vertical direction; rather, XST/(IMGY−1) and XED/(IMGY−1) which are values of the image not corrected in the vertical direction are used. The distortion corrected image CF in the present example shows a case in which the vertical correction ratio KRSY=0.86, the inclination θ1X is about 0.08, and the inclination θ2X is about 0.12.

The vertical correction ratio KRSY which is the correction parameter in the vertical direction, and the inclinations θ1X and θ2X which are the correction parameters in the horizontal direction can be independently set. The vertical correction ratio KRSY and the inclinations θ1X and θ2X are set arbitrarily by the user and stored in the control conditions register 158. The vertical correction ratio KRSY and the inclinations θ1X and θ2X can be set by setting buttons provided to the remote-control 134 (FIG. 1), for example.

The vertical correction ratio KRSY can be arbitrarily set to a value between 0 and 1. KSSY(=KRSY·IMGY) which is the number of lines in the vertical direction of the trapezoid image portion CFa, and KSY(=IMGY−KSSY) which is the number of lines in the vertical direction of the supplementary image portion CFb can be obtained based on the set vertical correction ratio KRSY and IMGY which is the number of lines in the vertical direction of the display image area IF (FIG. 4). Incidentally, KSSY which is the number of lines in the vertical direction of the trapezoid image portion CFa or KSY which is the number of lines in the vertical direction of the supplementary image portion CFb may be used as parameters instead of the vertical correction ratio KRSY.

The correction values in the horizontal direction, i.e., the inclinations θ1X and θ2X which are the parameters determining the amount of correction to the trapezoid distortion, can be set by the user to arbitrary values, independently of each other. Instead of directly setting the values of the inclinations θ1X and θ2X, two or more other parameters may be used to set the inclinations θ1X and θ2X.

Figure 5A:
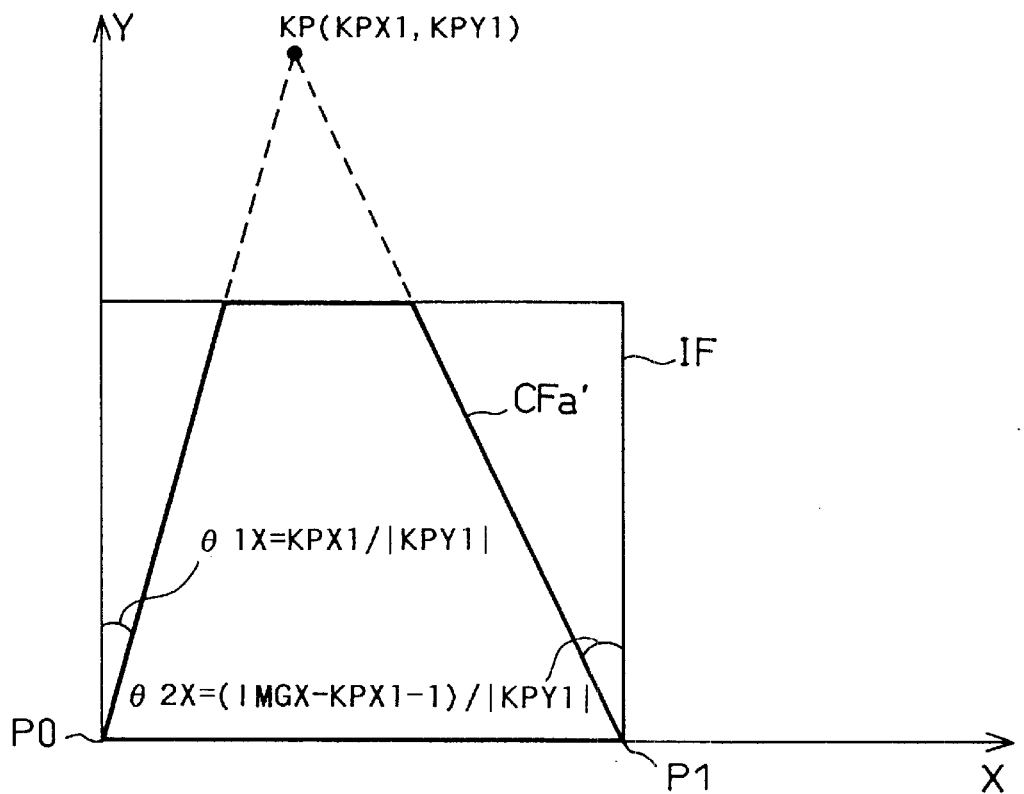
FIGS. 5(A) and 5(B) are explanatory diagrams describing a setting method for setting inclinations $\theta 1X$ and $\theta 2X$ which determine the amount of correction to the trapezoid distortion.
Figure 5B:
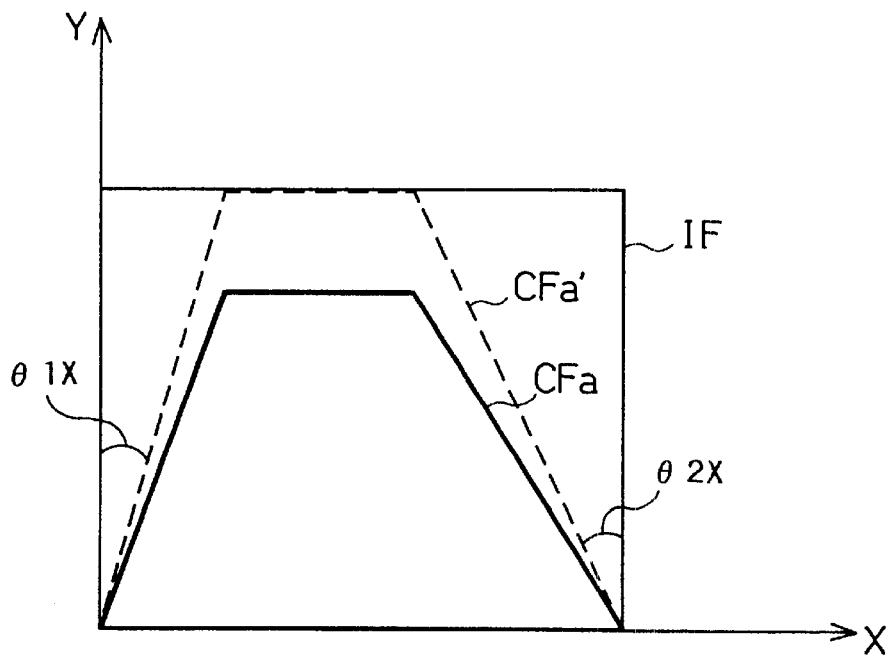
Figure 6:
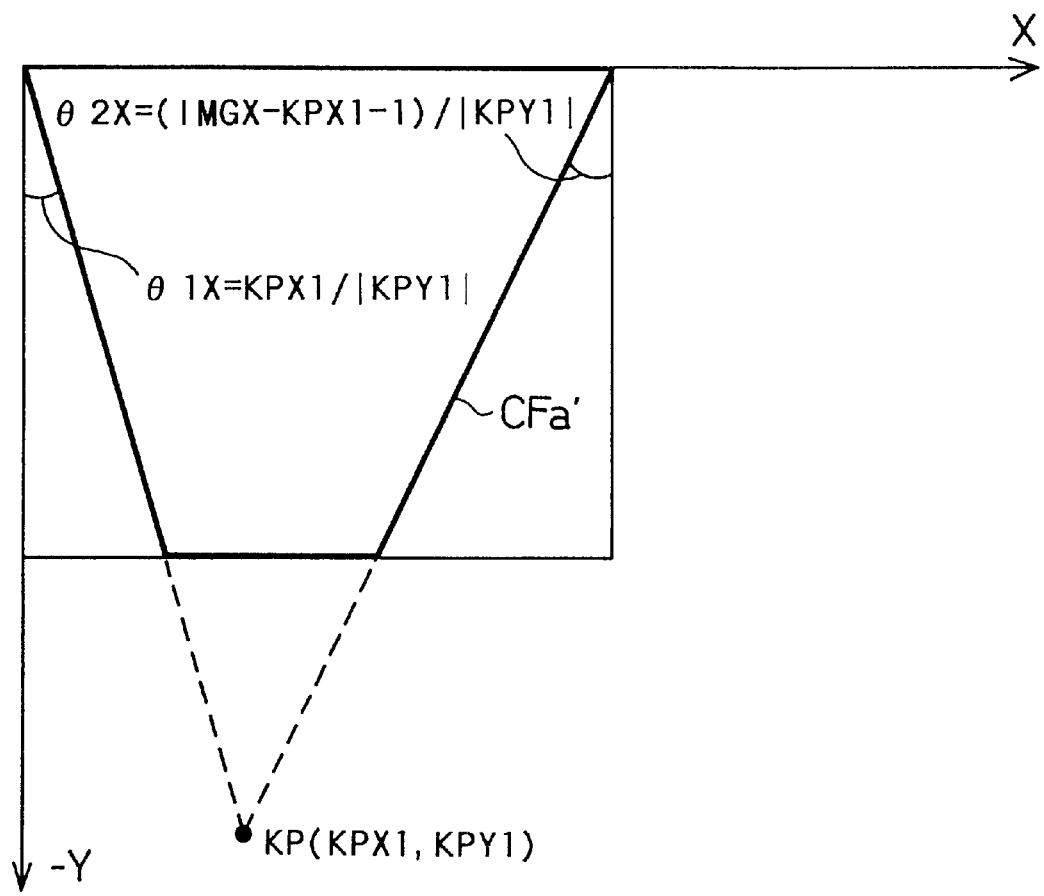
FIG. 6 is an explanatory diagram describing a setting method for setting the inclinations $\theta 1X$ and $\theta 2X$ which determine the amount of correction to the trapezoid distortion.

FIGS. 5(A)–5(B) and FIG. 6 are explanatory diagrams describing the setting method for setting the inclinations θ1X and θ2X which are the parameters determining the amount of correction to the trapezoid distortion. FIG. 5(A) shows an example in which the display image area IF which is equivalent to the display screen of the liquid crystal panel 126 and a trapezoid image portion CFa' are positioned at the first quadrant of the XY coordinates system such that the lower edges of the area IF and the image portion CFa' match.

The trapezoid image portion CFa' is defined by the inclination θ1X to the left edge of the display image area IF and the inclination θ2X to the right edge. In the example shown in FIG. 5(A), it is assumed that KSSY (FIG. 4(B)) which is the number of lines in the vertical direction of the trapezoid image portion CFa (FIG. 4) is equal to IMGY which is the number of lines in the vertical direction of the display image area IF.

If the user sets an arbitrary point KP (KPX1, KPY1) on the XY coordinates, a line segment KP-P0 connecting the point KP with the lower left point P0 of the display image area IF and a line segment KP-P1 connecting the point KP with the lower right point P1 are formed. Hence, the inclinations θ1X and θ2X of the trapezoid image portion CFa' are determined so these line segments KP-P0 and KP-P1 define the left edge and right edge of the trapezoid image portion CFa'. At this time, the inclinations θ1X and θ2X are determined by the coordinates of the point KP and the size of the display image area IF (IMGY which is the number of lines in the vertical direction and IMGX which is the number of pixels in the horizontal direction), as shown in the following expression:

$$\theta 1X = \frac{KPX1}{|KPY1|} \quad (4a)$$

$$\theta 2X = \frac{(IMGX - KPM1 - 1)}{|KPY1|} \quad (4b)$$

Thus, the inclinations θ1X and θ2X corresponding to an arbitrary trapezoid image portion CFa' can be set by setting the coordinates (KPX1, KPY1) of a point KP on the first quadrant of the XY coordinates.

As described above, the vertical correction ratio KRSY which is the correction parameter in the vertical direction can be set independently from the inclinations θ1X and θ2X which are the correction parameters in the horizontal direction. Accordingly, as shown in FIG. 4(B), the inclinations θ1X and θ2X of the trapezoid image portion CFa' set with vertical correction ratio KRSY=1 (the trapezoid image shown with broken lines) differ from the actual inclination of the trapezoid image portion CFa corrected in the vertical direction (the trapezoid image shown with solid lines). However, with the later-described correction computation, the trapezoid image portion CFa shown with solid lines can be obtained by using the values of the inclinations θ1X and θ2X of the trapezoid image portion CFa' shown with broken lines along with the vertical correction ratio KRSY, regardless of the value of the vertical correction ratio KRSY.

Also, there may be cases in which correction is to be made so the width of the lower edge of the trapezoid image portion CFa is reduced, opposite to FIG. 5(A). In such cases, as shown in FIG. 6, the display image area IF and the trapezoid image portion CFa' are positioned in the fourth quadrant of the XY coordinates system so the upper edges thereof are aligned, and so the upper left point thereof is the point of origin. In this case, the inclinations θH1X and θ2X can also be determined in exactly the same manner as with FIG. 5(A), the only difference being that the Y coordinate value of the point KP is negative.

Instead of using the inclinations θ1X and θ2X, XST which is the number of upper left supplementary pixels and XED which is the number of upper right supplementary pixels shown in FIG. 4(B) may be set as parameters. However, in such a case, it is preferable the parameters XST and XED be defined at their ratios to IMGX which is the number of pixels of the display image area IF in the horizontal direction. In this way, even if images with different resolutions are input to the image processing device, common correction parameter values can be used for correction as long as projection is performed with the same tilt angle.

The following is a description of the contents of a generation of a distortion corrected image, and the description is made by describing the operation of the trapezoid distortion correction circuit 152 if an original image MF shown in FIG. 4(A) is corrected to a distortion-corrected image OF shown in FIG. 4(B).

A-4. Overview of a Generation of a Distortion-corrected Image, and an Operation of the Trapezoid Distortion Correction Circuit 152

FIGS. 7(A)–7(C) are explanatory diagrams showing the procedures for distortion correction processing. In distortion correction processing, each line of the original image MF shown in FIG. 7(A) is first reduced by a horizontal correction ratio FRSX according to the inclinations θ1X and θ2X (FIG. 7(B)). Then, the image reduced in the horizontal direction is reduced by a vertical correction ratio KRSY, thereby obtaining the trapezoid image portion CFa of the distortion-corrected image CF shown in FIG. 7(C). The reduction in the vertical direction is performed so the reduction factor is greater in the upper side of the original image MF than in the lower side so as to correct a difference in enlargement factor due to the tilt projection in the upper direction, which is greater in the upper side than in the lower side.

First, the operation of the horizontal correcting circuit 172 shown in FIG. 3 will be described. Input to the horizontal correction control circuit 190 are a line address LAD, pixel address PAD, and a first line address control signal DSPV. The line address LAD and pixel address PAD represent those on the display image area IF, i.e., the line address in the vertical direction and pixel address in the horizontal direction on the liquid crystal panel 126, output from the reading/writing control circuit 146 (FIG. 2). The first line address control signal DSPV is output from the vertical correction control circuit 170 of the vertical correction circuit 170 described later. Provided to the horizontal correction control circuit 190 are the inclinations θ1X and θ2X (FIG. 4) of both left and right edges of the trapezoid image portion CFa stored in the control conditions register 158 (FIG. 2). The horizontal correction control circuit 190 performs later described calculations based on the line address LAD, pixel address PAD, and first line address control signal DSPV, so as to generate first and second pixel selection signals DSPH and SELH, and first and second pixel address control signals PADC1 and PADC2. The first and second pixel selection signals DSPH and SELH are supplied to the selector 198. The first and second pixel address control signals PADC1 and PADC2 are supplied to the pixel address generating circuit 202.

The pixel address generating circuit 202 generates a reading address for reading out the original image MF stored in the frame memory 120 (FIG. 2), based on the supplied first and second pixel address control signals PADC1 and PADC2, and supplies the address to the frame memory 120.

The image signal VPa for one pixel read from the frame memory 120 is stored in the pixel buffer 192. The image signal stored in the pixel buffer 192 when the time of the image signal for the next pixel is supplied from the frame memory 120. Accordingly, the image signal VPb read from the pixel buffer 192 is an image signal one pixel before the image signal VPa provided from the frame memory 120. The adder 194 adds the image signal VPa supplied from the frame memory 120 and the image signal VPb read from the pixel buffer 192. The multiplier 196 multiplies the added image signals by ½. The image signal VPab output from the multiplier 196 is an average of the image signal VPa supplied from the frame memory 120 and the image signal VPb one pixel before. This averaged image signal VPab is input to the A input terminal of the selector 198. The image signal VPa supplied from the frame memory 120 is input to the B input terminal of the selector 198. Also, a black level signal VBLK is input to the C input terminal of the selector 198. The selector 198 selects one of the image signals VPab, VPa, and VBLK, according to the levels of the first and second pixel selecting signals DSPH and SELH.

FIG. 8 is an explanatory diagram showing parameters calculated for each line arrayed in the vertical direction of the various parameters related to the operations of the horizontal correction control circuit 190 and the pixel address generating circuit 202. LAD is a line address in the vertical direction of the liquid crystal panel 126 (display image area IF). DSPV represents a first line selecting signal for controlling whether to read image data from the frame memory 120 for each line of the display image area IF or whether to create a black level image. MLAD* represents an identical value to the later-described reading line address MLAD for the original image MF. STA represents the pixel address for starting displaying image data of the original image MF for each line in the display image area IF, and EDA represents the pixel address for ending the display of image data of the original image MF. FRSX represents the ratio between the total number of pixels in the horizontal direction of the liquid crystal panel 126 (the number of pixels in the display image area IF) and the number of pixels in the horizontal direction of the area wherein the original image MF is displayed.

The horizontal correction control circuit 190 (FIG. 3) calculates the address value MLAD*, which is the same as the reading line address MLAD, based on the first line selecting signal DSVP and the line address LAD. This function is similar to a function of the later-described line address generating circuit 200. Accordingly, an arrangement may be used in which the first line selecting signal DSVP is not input to the horizontal correction control circuit 190, but rather the reading line address MLAD output from the line address generating circuit 200 is input. Details of the first line selecting signal DSVP and the reading line address MLAD will be described later.

The horizontal correction control circuit 190 calculates the starting pixel address STA and ending pixel address EDA by the following expressions (5a) and (5b), based on the inclinations θ1X and θ2X, IMGY which is the number of lines in the vertical direction (the number of lines in the vertical direction of the liquid crystal panel 126), and the reading line address MLAD.

$$STA = \theta 1X[(IMGY-1)-MLAD] \quad (5a)$$

$$EDA = IMGX-1-\theta 2X[(IMGY-1)-MLAD] \quad (5b)$$

The horizontal correction control circuit 190 further calculates the horizontal correction ratio KRSX of the trapezoid image portion CFa to the display image area IF by the following Expression (6), based on the starting pixel address STA and ending pixel address EDA, and IMGX which is the number of pixels in the horizontal direction of the display image area IF.

$$KRSX = \frac{EDA - STA + 1}{IMGX} \quad (6)$$

Then, the horizontal correction ratio FRSX, which will be used to obtain the distortion-corrected image (FIG. 5(B)) from the original image MF, is calculated based on the ratio between MEMX, which is the number of pixels in the horizontal direction in the original image MF stored in the frame memory 120, and IMGX which is the number of pixels in the horizontal direction of the display image area IF (ratio of reduction RSX=IMGX/MEMX) and the horizontal correction ratio KRSX provided by the above Expression (6).

$$FRSX = KRSX \cdot RSX = \frac{EDA - STA + 1}{MEMX} \quad (7)$$

The above calculation is performed for each line in the display image area IF, the starting pixel address STA and ending pixel address EDA, and the horizontal correction ratio FRSX are calculated. FIG. 8 shows the parameters for each line calculated based on the original image MF shown in FIGS. 4(A) and 4(B) (MEMX=700 pixels, MEMY=500 lines), the display image area IF (IMGX=700 pixels, IMGY=500 lines), an inclination $\theta 1X$ of about 0.08, and an inclination $\theta 2X$ of about 0.12.

The first line selecting signal DSPV provided to the horizontal correction control circuit 190 from the vertical correction control circuit 180 is maintained at an L level for the section of KSY lines at the upper part of FIG. 7(C). As described later, no image is displayed for the lines at this section, so there is no need to read image signals from the frame memory 120. Now, for the section in which the first line selecting signal DSPV is at an L level, the horizontal correction control circuit 190 sets the first pixel selecting signal DSPH at an L level, and the selector 198 outputs the image signal input to the C input terminal (i.e., the black level signal VBLK is selected and is output as output image signal RV2). Also, for the section in which the first line selecting signal DSPV is at an L level, the reading line address MLAD shown in FIG. 7 remains at 0, and there is no change in the parameters calculated based on the Expressions (5a) through (7). After first line selecting signal DSPV changes to an H level, the reading line address MLAD* also changes according to change in the line address LAD, and the values of the parameters are calculated accordingly.

As described above, the starting pixel address STA and the ending pixel address EDA can be separately calculated based on the inclinations $\theta 1X$ and $\theta 2X$, respectively. The horizontal correction ratio FRSX can be calculated for determining how many pixels in a line of the display image area IF (FIG. 4) corresponds to one line in the original image MF (FIG. 4).

Incidentally, an arrangement may be used in which the reading line address MLAD* for each line address LAD shown in FIG. 8, the starting pixel address STA, ending pixel address EDA, and horizontal correction ratio FRSX are calculated by the CPU 130 beforehand based on the inclinations $\theta 1X$ and $\theta 2X$ and the vertical correction ratio (vertical reduction ratio) KRSY. The values are stored in the control conditions register 158 and supplied to the vertical correction control circuit 180 and the horizontal correction control circuit 190.

FIG. 9 is an explanatory diagram showing parameters calculated for each pixel in a line, out of the various parameters regarding the operation of the horizontal correction control circuit 190 and the pixel address generating circuit 202 when the line address LAD is equal to 70 (See FIG. 8). FRSX represents the ratio between the total number of pixels in the horizontal direction of the liquid crystal panel 126 (the number of pixels in the display image area IF) and the number of pixels in the horizontal direction of the area in which the original image MF is actually displayed. PAD represents the pixel address in the horizontal direction of the liquid crystal panel 126 (pixel address in the horizontal direction of the display image area IF), BPAD represents a reference pixel address which is sequentially incremented by 1 from the left edge position toward the right in the trapezoid image portion CFa (FIG. 4(B)) on each line, RSPAD represents the results of the reference pixel address BPAD divided by the horizontal correction ratio FRSX, and MPAD represents the reading pixel address of the original image MF. Also, PADC1 and PADC2 represent first and second pixel address control signals supplied to the pixel address generating circuit 202, and DSPH and SEHL represent first and second image selecting signals supplied to the selector 198. RV1 represents which pixel in the original image MF corresponds to the image data read from the frame memory 120, and RV2 represents which pixel in the original image MF corresponds to the image data read from the selector 198.

As can be understood from FIG. 7(C), the trapezoid image portion CFa has a different number of pixels for each line. The reference pixel address BPAD shown in FIG. 9 represents a sequential pixel number in the line of the trapezoid-shaped image. Specifically, the value of the reference pixel address BPAD is 0 for the pixel at the left edge position of the trapezoid image portion CFa (e.g., the position of PAD=40 at LAD=70), and is 599 for the pixel at the right edge position of the trapezoid image portion CFa (e.g., the position of PAD=639 at LAD=70). The value of the reading pixel address MPAD provided to the frame memory 120 is 0 for the pixel at the left edge position of the trapezoid image portion CFa (PAD=40 at LAD=70), and is 698 for the pixel at the right edge position of the trapezoid image portion CFa (PAD=639 at LAD=70). Accordingly, it can be considered the pixel address PAD of the liquid crystal panel and the reading pixel address MPAD represent the relationship between each pixel in each line of the original image MF stored in the frame memory 120 and each pixel in each line of the trapezoid image portion CFa.

If a pixel address PAD no less than the starting pixel address STA, (FIG. 8) is input to the horizontal correction control circuit 190, the pixel address control signal PADC1 changes from an L level to H level, following which the reference pixel address BPAD starts at 0 and is incremented by 1 each time the pixel address PAD increases by 1. Then, when a pixel address PAD exceeding the ending pixel address EDA is input to the horizontal correction control circuit 190, the first pixel address control signal PADC1 changes from an L level to H level, following which the reference pixel address BPAD no longer changes even though the pixel address PAD may change. In the example shown in FIG. 9, incrementing of the reference pixel address BPAD is started from pixel address PAD of 40, and updating of the reference pixel address BPAD is stopped at the pixel address PAD of 639 (BPAD=599). RSPAD is a value obtained by rounding the results of the reference pixel address BPAD divided by the horizontal correction ratio FRSX to an integer, and in the example shown in FIG. 9, RSPAD changes in the order of 0, 1, 2, 3, 4, 5, 7, 8, 9, and so forth.

If the division result RSPAD is increased by +2 from the preceding result, the second pixel address control signal PADC2 is set at an H level while being set at an L level at all other times. That is, each time the reference pixel address is updated, the horizontal correction control circuit 190 divides the reference pixel address BPAD by the horizontal correction ratio FRSX. If the division result RSPAD is increased by +2 from the preceding result, changes the second pixel address control signal PADC2 to an H level. On the other hand, if the division result RSPAD is increased by +1 from the preceding result, the horizontal correction control circuit 190 makes the second pixel address control signal PADC2 to be an L level. In the example shown in FIG. 8, it can be understood the second pixel address control signal PADC2 is at an H level when the reference pixel address BPAD is 6.

The reading pixel address MPAD is incremented by +1 if the second pixel address control signal PADC2 is at an L level, and is incremented by +2 if PADC2 is at an H level. Accordingly, MAPD represents the same value as RSPAD.

During the section from pixel address PAD of 0 to STA (=40), the pixel address control signal PADC1 maintains the L level and the reference line address BPAD and reading pixel address MAPD remain unchanged at 0. At this time, the first and second pixel selecting signals DSPH and SELH maintain the L level, and the image signal input to the C input terminal of the selector 198, i.e., the black level signal VBLK, is selected and is output as the output image signal RV2.

During the section the pixel address PAD is equal to or greater than STA (PAD≧40) and equal to or smaller than EDA (PAD≦639), the first pixel address control signal PADC1 and the first pixel selecting signal DSPH are maintained at an H level, the reference line address BPAD changes according to updating of the pixel address PAD, and the reading pixel address MPAD is output from the pixel address generating circuit 202 (FIG. 3). In accordance with the change of the reading pixel address MPAD in the order of 0, 1, 2, 3, 4, 5, 7, 9, and so forth, image data DP0, DP1, DP2, DP3, DP4, DP5, DP7, DP9, and so forth are read from the frame memory 120, and are input to the horizontal correcting circuit 172 as image signals RV1. The second pixel selecting signal SELH has the same value as the pixel address control signal PADC2. If the second pixel selecting signal SELH is at an L level, the image signal VPa input to the B input terminal of the selector 198 is selected and output as the output image signal RV2. That is, while the reading pixel address MPAD is changing by +1, starting from 0, the image data DP0, DP1, DP2, DP3, and so forth read from the frame memory 120 are selected and output as the output image signal RV2.

On the other hand, when the second pixel address control signal PADC2 is at an H level, the second pixel selecting signal SELH also changes from an L level to H level. The image signal VPab input to the A input terminal of the selector 198 is selected and output as the output image signal RV2. That is, the signal (i.e., (DP5+DP7)/2) obtained by averaging the image signal VPa which is read while skipping one pixel (image data DP7 of the 7th pixel) and the image signal VPb which is read one pixel before (image data DP5 of the 5th pixel), is output as the output image signal RV2. This image signal VPab is obtained by averaging image signals before and after a dropout pixel to implement interpolation of image data for the pixel which has dropped out due to the skipping of reading line address by one pixel. That is, the buffer 192, adder 194, multiplier 196, and selector 198 shown in FIG. 3 have the function of serving as a filter circuit to relieve non-continuity of pixels due to pixel dropout.

When the pixel address PAD exceeds EDA (=639), the first pixel address control signal PADC1 changes from an H level to L level, and updating of the reference line address BPAD and the reading pixel address MPAD is stopped. At this time, the first and second pixel selection signals DSPH and SELH also remain at the L level, and the image signal input to the C input terminal of the selector 198, i.e., the black level signal VBLK, is selected and output as the output image signal RV2.

Instead of controlling updating of the reading pixel address MPAD at the pixel address generating circuit 202 according to the level of the first and second pixel address control signals PADC1 and PADC2, updating of the reading pixel address MPAD may be controlled independently in the pixel address generating circuit 202. In this case, a circuit similar to the horizontal correction control circuit 190 would be provided in the pixel address generating circuit 202, so as to generate signals corresponding to the first and second pixel address control signals PADC1 and PADC2. Particularly, if the horizontal correction ratio FRSX is smaller than 0.5, the reading pixel address MPAD (division result RSPAD) may change by 2 or more, so it is difficult to generate the reading pixel address MPAD in the pixel address generating circuit 202 as described above according to the first and second pixel address control signals PADC1 and PADC2. In such cases, it is preferable to provide the horizontal correction control circuit 190 with a pixel address generating circuit.

Figure 10:
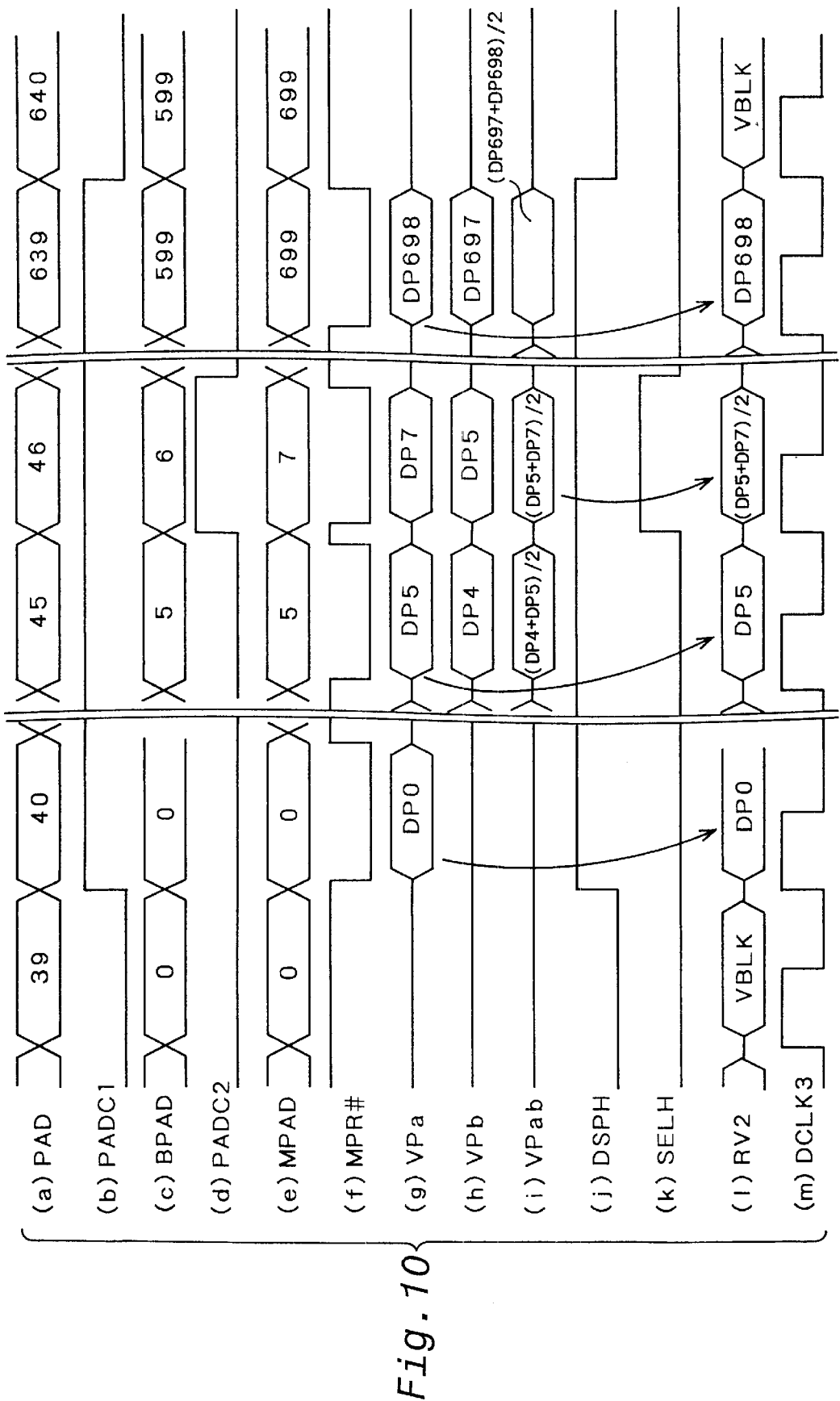
FIG. 10 is a timing chart showing the operation of a horizontal correcting circuit.

FIG. 10 is a timing chart showing the operation of the horizontal correcting circuit 172. FIG. 10(*a*) shows the pixel address PAD, and FIG. 10(*c*) shows the reference pixel address BPAD. FIG. 10(*b*) shows the first pixel address control signal PADC1, and FIG. 10(*d*) shows the second pixel address control signal PADC2. FIG. 10(*e*) shows the reading pixel address MAPD. The reading control signal MPR# shown in FIG. 10(*f*) is a signal for permitting reading from the frame memory 120, and is supplied from the reading/writing control circuit 146 to the frame memory 120. This signal MPR# is of negative logic, and reading of image signals is permitted only when the level thereof is L.

As shown in FIG. 10(*a*) through (*c*), until the pixel address PAD, increasing by 1, reaches the starting pixel address STA (=40), the first pixel address control signal PADC1 remains at an L level, and the reference pixel address BPAD remains at 0. After the pixel address PAD is equal to or greater than the starting pixel address STA and the first pixel address control signal PADC1 changes to an H level, the reference pixel address BPAD also is incremented by 1 according to the change of the pixel address PAD. The reading pixel address shown in FIG. 10(*e*) also is incremented by 1 according to the change in the reference pixel address BPAD. However, when the second pixel address control signal PADC2 shown in FIG. 10(*d*) is an H level, the reading pixel address MPAD is incremented by 2. These address changes are executed synchronously with the dot clock signal DCLK3 shown in FIG. 10(*m*). Then, during the section where the reading control signal MPR# shown in FIG. 10(*f*) is at an L level, image data DP0, DP1, DP2, DP3, DP4, DP5, DP7, DP9, and so forth according to the reading pixel address MPAD is read from the frame memory 120 (FIG. 1) as shown in FIG. 10(*g*), input to the horizontal correcting circuit 172 (FIG. 3) as image signals VPa, and input to the selector 198. Also, the image signal VPb for the preceding pixel is output from the pixel buffer 192 (FIG. 3), and input to the selector 198. Further, the image signals VPa and VPb are added and averaged, producing VPab shown in FIG. 10(*i*). Then, this image signal VPab is input to the selector 198.

The first pixel selecting signal DSPH shown in FIG. 10(j) changes according to the change of the first pixel address control signal PADC1. While the first pixel selecting signal DSPH is at the L level, the black level signal VBLK is selected at the selector 198 and output as the output image signal RV2. Once the first pixel selecting signal DSPH changes to the H level, the image signal VPa is selected at the selector 198 and output as the output image signal RV2 while the second pixel selecting signal SELH is at the L level. On the other hand, the image signal VPab is selected at the selector 198 and is output as the output image signal RV2 while the second pixel selecting signal SELH is at the H level, i.e., if the second pixel address control signal PADC2 changes to the H level and the reading pixel address MPAD increases by 2.

In this way, the horizontal correcting circuit 172 shown in FIG. 3 determines which pixels of the original image MF (FIG. 4) correspond to each pixel of each line in the display image area IF (FIG. 4) of the liquid crystal panel 126 (FIG. 1), according to the horizontal trapezoid distortion correcting parameters (FIG. 8 and FIG. 9) calculated in the horizontal correction control circuit 190. Further, in the Expressions (5a) through (7) used in this calculation, the only horizontal correction parameters which the user needs to adjust for trapezoid distortion correcting are inclinations θ1X and θ2X, so adjustment can be made easily. Also, because the inclinations θ1X and θ2X can be independently set, so trapezoid distortion can be corrected even if not only is there a vertical tilt angle, but there is also a tilt angle in the horizontal direction as well, meaning the form of the trapezoid distortion is not horizontally symmetrical. If the form of the trapezoid distortion is horizontally symmetrical, θ1X=θ2X can be set to use a common inclination θ1X to correct the trapezoid distortion.

Next, the operation of the vertical correction control circuit 170 shown in FIG. 3 will be described. The line address of the display image area IF (i.e., the line address LAD in the vertical direction of the liquid crystal panel 126) is input to the vertical correction control circuit 180 from the reading/writing control circuit 146 (FIG. 2). Also, the vertical correction ratio KRSY, stored in the control conditions register 158 (FIG. 2) is provided. The vertical correction control circuit 180 performs a later-described computation according to this line address LAD and vertical correction ratio KRSY, and generates first and second line selecting signals DSPV and SELV and first and second line address control signals LADC1 and LADC2. The first and second line selecting signals DSPV and SELV are supplied to the selector 188. The first and second line address control signals LADC1 and LADC2 are supplied to the line address generating circuit 200.

The line address generating circuit 200 generates a reading address for the original image MF stored in the memory 120 from the first and second line address control signals LADC1 and LADC2, and executes reading of the original image MF.

The one line of image signals VLa output from the horizontal correcting circuit 172 is stored in the line buffer 182. The image signals stored in the line buffer 182 are read out when the next line of image signals is supplied from the horizontal correcting circuit 172. Accordingly, the image signal VLb read from the line buffer 182 is an image signal one line earlier than the image signal VLa provided from the horizontal correcting circuit 172. The adder 184 adds the image signal VLa supplied from the horizontal correcting circuit 172 and the image signal VLb read from the line buffer 182, and the multiplier 186 multiplies the added image signals by ½. The image signal VLab output from the multiplier 186 is an average of the image signal VLa supplied from the horizontal correcting circuit 172 and the image signal VLb for the preceding line. This averaged image signal VLab is input to the A input terminal of the selector 188. The image signal VLa supplied from the horizontal correcting circuit 172 is input to the B input terminal of the selector 188. Also, a black level signal VBLK is input to the C input terminal of the selector 188. The selector 188 selects one of the three image signals VLab, VLa, and VBLK, based on the levels of the first and second line selecting signals DSPV and SELV.

FIG. 11 is an explanatory diagram showing the various parameters relating to the operation of the vertical correction control circuit 180 and line address generating circuit 200. Here, LAD represents the vertical line address of the liquid crystal panel 126, BLAD represents the reference line address which is sequentially incremented by 1 from the upper edge position of the trapezoid image portion CFa (FIG. 4(B)) downwards, and OFFLAD represents the difference (offset line address) between the reference line address BLAD and the reading line address MLAD actually provided to the frame memory 120. LADC1 and LADC2 represent first and second line address control signals supplied to the line address generating circuit 200, and DSPV and SELV represent first and second line selecting signals supplied to the selector 188. RV2 represents which line in the original image MF corresponds to the image data output from the horizontal correcting circuit 172, and RV3 represents which line in the original image MF corresponds to the image data output from selector 188.

The value of the line address LAD, or a start line address STLAD, from which incrementing of the reference line address begins is calculated by the following Expressions (8a) and (8b), based on the vertical correction ratio KRSY and IMGY which is the number of lines in the vertical direction of the display image area IF.

$$KSSY = KRSY \cdot IMGY \quad (8a)$$

$$STLAD = IMGY - KSSY \quad (8b)$$

Also, the offset line address OFFLAD is calculated by the following expression (9), for example.

$$OFFLAD = STLAD \cdot \sin\left(\frac{\pi}{2} \cdot \frac{LAD - STLAD}{KSSY - 1}\right) \quad (9)$$

The function used for the calculation to obtain the offset line address OFFLAD can be an arbitrary monotone function, such as one where 0 is yielded when (LAD−STLAD)=0, and where 1 is yielded when (LAD−STLAD)=(KSSY−1), so exponential functions and the like can be used, and is not restricted to trigonometric functions. The vertical distortion due to the tilt projection in the upwards direction becomes greater towards the top of the image, so the line density of the image displayed on the projection screen is smaller in the higher position on the image, and is greater in the lower position on the image. Accordingly, it is preferable that there are included many lines in the original image MF corresponding to the smaller base of the trapezoid image CFa, and that there are included few lines in the original image MF corresponding to the greater base of the trapezoid image CFa. The offset address OFFLAD is set so as to satisfy the above relationship between the lines of the trapezoid image CFa and the lines of the original image MF.

The reading line address MLAD is calculated from the following Expression (10) based on the reference line address BLAD and offset address OFFLAD.

$$MLAD = \frac{(BLAD + OFFLAD)}{RSY} \quad (10)$$

Here, RSY represents a ratio of IMGY to MEMY, or vertical enlargement/reduction ratio, in which MEMY is the number of lines of the original image area MF and IMGY is the number of vertical lines in the display image area IF. In the present embodiment, RSY=1, as shown in FIG. 4. This vertical enlargement/reduction ratio will be described later.

As can be understood from FIG. 4(B), the trapezoid image portion CFa has 430 lines. The reference line address BLAD shown in FIG. 11 represents the sequential line number for each of the 430 lines in the trapezoid image portion CFa. That is, the value of the reference line address BLAD is 0 for the upper edge position on the trapezoid image portion CFa (LAD=70), and is 429 for the lower edge position on the trapezoid image portion CFa (LAD=499). The value of the reading line address MLAD provided to the frame memory is 0 for the upper edge position on the trapezoid image portion CFa (LAD=70), and is 499 for the lower edge position on the trapezoid image portion CFa (LAD=499). Accordingly, the line address LAD and reading line address MLAD of the liquid crystal display panel can be considered to represent a relationship between the lines of the original image IM stored in the frame memory 120, and the lines of the trapezoid image portion CFa. Also, the offset address OFFLAD represents at which position in the 430 lines of the trapezoid image portion CFa the 70 lines at the upper part of the supplementary image portion CFb will be absorbed.

When the line address LAD equal to or greater than the starting line address STLAD (=70) is input to the vertical correction control circuit 180, the line address control signal LADC1 changes from an L level to an H level, and subsequently, each time the line address LAD is incremented by 1, the reference line address BLAD also is incremented by 1, starting from 0. During the section from where the line address LAD is between 0 and STLAD, the line address control signal LADC1 maintains the L level, and the reference line address BLAD, offset line address OFFLAD, and reading line address MLAD all remain unchanged at 0. At this time, the first and second line selecting signals DSPV and SELV maintain an L level, and the image signal input to the C input terminal of the selector 188, i.e., the black level signal VBLK is selected and output as the output image signal RV3.

While the line address LAD is equal to or greater than STLAD (LAD≧70), the first and second line address control signals LADC1 and LADC2 maintain an H level. At this time, the reference line address BLAD changes by 1 at a time from 0 according to the change of the line address LAD, and the reading line address MLAD is calculated from the Expressions (8a) through (10).

However, with the circuit shown in FIG. 3, the line address generating circuit 200 updates the reading line address MLAD according to the line address control signals LADC1 and LADC2 provided from the vertical correction control circuit 180, rather than using the Expressions (8a) through (10). If the offset line address OFFLAD does not change from its value at the line address LAD for the preceding line, the line address control signal LADC2 maintains the L level, and the reading line address MLAD changes by 1 according to the change of the reference line address BLAD. On the other hand, if the offset line address OFFLAD changes, the line address control signal LADC2 changes to the H level. If the line address control signal LADC2 changes to the H level, the line address generating circuit 200 (FIG. 3) increments the reading line address MLAD by +2. In FIG. 11, e.g., if the line address LAD changes from 71 to 72, the offset line address OFFLAD changes from 0 to 1. At this time, the line address control signal LADC2 changes to the H level, and the reading line address MLAD changes from 1 to 3.

Image data DL0, DL1, DL3, DL4, and so forth according to the changes in the reading line address MLAD of 0, 1, 3, 4, and so forth are input as output image signals RC2 to the vertical correction control circuit 170 from the horizontal correcting circuit 172. When the reading line address MLAD is changing by 1 at a time, the second selecting signal SELV maintains the L level, and the image signal VLa input to the B input terminal of the selector 188 is selected and output as the output image signal RV3. On the other hand, if the reading line address MLAD changes by +2, the second selecting signal SELV changes to the H level, and the image signal VLab input to the A input terminal of the selector 188 is selected and output as the output image signal RV3. That is, a signal obtained by averaging the image signal VLa read out while skipping a line (image data DL3 of line No. 3) and the image signal VLb read out one line before (image data DL1 of line No. 1) is output as the output image signal RV3. This image signal VLb is a signal obtained by averaging image signals before and after a dropout line to implement interpolation of image data for the dropped line due to one reading line address being skipped. That is, the buffer 182, adder 184, multiplier 186, and selector 188 shown in FIG. 3 implement a filter circuit to relieve line dropout.

Incidentally, instead of controlling the updating of the reading line address MLAD at the line address generating circuit 200 according to the level of the first and second line address control signals LADC1 and LADC2 as described above, the reading line address MLAD may be independently updated within the line address generating circuit 200. In this case, a circuit similar to the vertical correction control circuit 180 is provided in the line address generating circuit 200, so as to generate signals corresponding to the first and second line address control signals LADC1 and LADC2. Particularly, if the vertical correction ratio KRSY is smaller than 0.5, the reading line address MLAD (offset line address OFFLAD) may change by 2 or more, so it is difficult to generate the reading line address MLAD in the line address generating circuit 200 as described above according to the first and second line address control signals LADC1 and LADC2. In such cases, it is preferable to provide the vertical correction control circuit 180 with a line address generating circuit.

Figure 12:
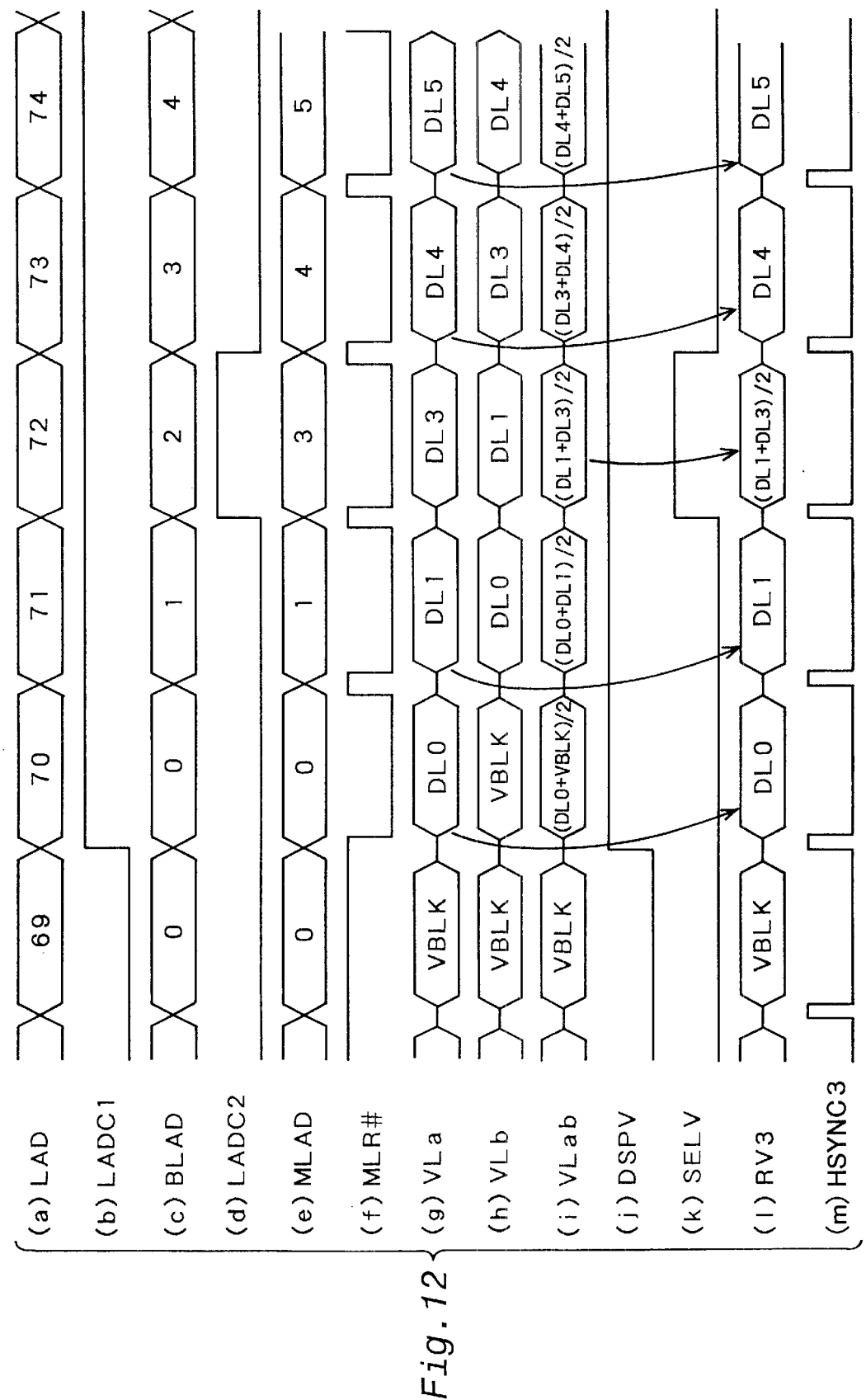
FIG. 12 is a timing chart showing the operation of a vertical correcting circuit.
Figure 18A:
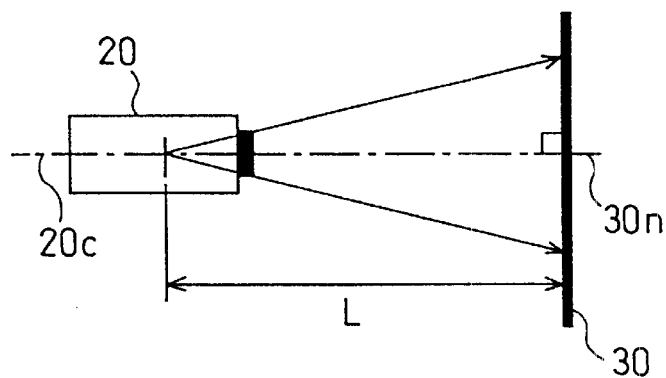
FIGS. 18(A)–18(D) are explanatory diagrams illustrating a projected image with a background projection-type display apparatus.
Figure 18B:
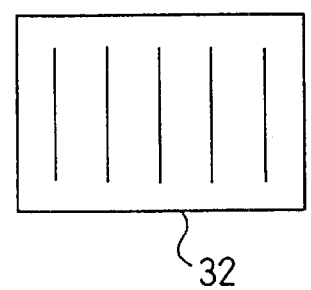
Figure 18C:
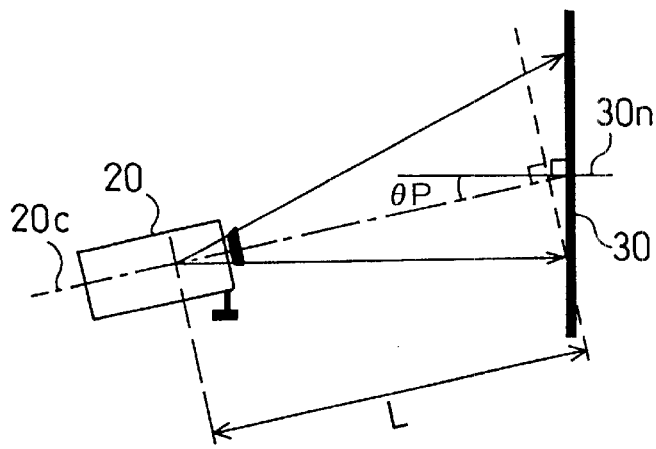
Figure 18D:
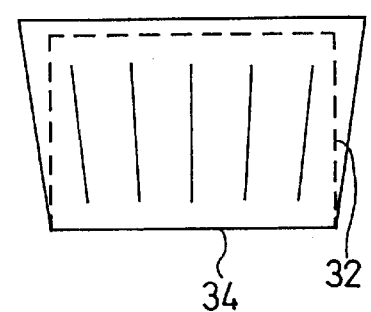

FIG. 12 is a timing chart showing the operation of the vertical correcting circuit 170. FIG. 12(a) shows the line address LAD, and FIG. 12(c) shows the reference line address BLAD. FIG. 12(b) shows the first line address control signal LADC1, and FIG. 12(d) shows the second line address control signal LADC2. FIG. 12(e) shows the reading line address MAPD. The reading control signal MPR# shown in FIG. 12(f) is a signal for permitting reading from the frame memory 120, and is supplied from the reading/writing control circuit 146 to the frame memory 120. This signal MPR# is of negative logic, and reading of image signals is permitted only when the level thereof is L. Also, signals similar to the signal MPR# are input to the line buffer 182 shown in FIG. 3 and input and output of image signals at the line buffer 182 is executed at approximately the same timing as the reading from the frame memory 120.

As shown in FIGS. 12(a) through (c), until the line address LAD, increasing by 1, reaches the starting line address STLAD (=70), the first line address control signal LADC1 remains at an L level, and the reference line address BLAD remains at 0. After the line address LAD is equal to or greater than the starting line address STLAD and the first line address control signal LADC1 changes to an H level, the reference line address BLAD also is incremented by 1 according to the change of the line address LAD. The reading pixel address shown in FIG. 12(e) also is incremented by 1 according to the change in the reference line address BLAD. However, if the second line address control signal LADC2 shown in FIG. 12(d) is an H level, the reading line address MLAD is incremented by 2. These address changes are executed synchronously with the synchronizing signal HSYNC3 shown in FIG. 12(m). Then, during the section in which the reading control signal MPR# shown in FIG. 12(f) is at an L level, image data DL0, DL1, DL3, and so forth according to the reading line address MLAD are read from the frame memory 120 (FIG. 1) as shown in FIG. 12(g), input to the vertical correcting circuit 170 (FIG. 3) as image signals VLa, and input to the selector 188. Also, the image signal VLb for the preceding line output from the line buffer 182 (FIG. 3), and input to the selector 188, at approximately the same time as input of the image signal VLa to the line buffer 182 (FIG. 3). Further, the image signal VLa and image signal VLb are averaged, creating VLab shown in FIG. 12(i). Then, this image signal VLab is input to the selector 188.

The first line selecting signal DSPV shown in FIG. 12(j) changes according to the change of the first line address control signal LADC1. While the first line selecting signal DSPV is at the L level, the black level signal VBLK is selected at the selector 188 and output as the output image signal RV3. Once the first line selecting signal DSPV changes to the H level, the image signal VLa is selected at the selector 188 and output as the output image signal RV3 while the second line selecting signal SELV is at the L level. On the other hand, the image signal VLab is selected at the selector 188 and output as the output image signal RV3 while the second line selecting signal SELV is at the H level, i.e., if the second line address control signal LADC2 changes to the H level and the reading line address MLAD increases by 2.

In this way, the vertical correcting circuit 170 shown in FIG. 3 determines which lines of the original image MF (FIG. 4) correspond to the line of the display image area IF (FIG. 4) of the liquid crystal panel 126 (FIG. 1), according to the vertical correcting parameters (FIG. 11) determined in the vertical correction control circuit 180. Further, in the expressions (2) through (4) used in this determining, the vertical correction ratio KRSY is the only vertical correction parameter which the user needs to adjust for correcting the distortion in the image generated by tilt projection, so adjustment can be made more easily than with the conventional device.

Incidentally, while the above vertical correcting circuit 170 has been described with reference to an example in which the area to form a black image (the area of KSY number of lines) of the distortion corrected image according to the vertical correction ratio KRSY is provided above the trapezoid image portion CFa, but this area may be provided below the image portion CFa.

Also, description has been made in which the enlargement/reduction ratio RSX=1 and RSY=1 regarding the operation description of the above vertical correcting circuit 170 and horizontal correcting circuit 172, the enlargement/reduction ratio RSX and RSY can be set within a range of 0 to 1. For example, as shown in FIG. 2, image signals DC3 stored in the frame memory without passing through the reduction/filter circuit 144 (e.g., image signals written via a bus connected to the CPU 130) may be an image of a size greater than the display size of the liquid crystal panel 126, i.e., the display image area IF (FIG. 4). In such cases, the image stored in the frame memory 120 may be reduced to the size of the display image area IF by setting the enlargement/reduction ratios RSX and RSY. That is, the trapezoid distortion correction circuit 152 also serves as a reduction/filter circuit. Also, when the original image MF is smaller than the display image area IF, the distortion-corrected image is produced in the distortion correction circuit 152 while the enlargement/reduction ratios RSX and RSY are set at 1, respectively, and the distortion-corrected image may be enlarged in the enlarging/filter circuit 154.

Also, the reduction/filter circuit 144 may vertically reduce an image according to the vertical correction ratio KRSY to implement the vertical correction, and the trapezoid distortion correction circuit 152 may only perform the horizontal correction.

Also, in the above description, an example is described in which the image CFa including the distortion corrected image CF is a trapezoid image such that the width of the upper edge is reduced. In the case of a trapezoid image of a reversed shape, the following expression would be used instead of expressions (5a) and (5b).

$$STA = \theta 1X \cdot MLAD \quad (11a)$$

$$EDA = (IMGX-1) - \theta 2X \cdot MLAD \quad (11b)$$

As described above, with the trapezoid distortion correction circuit 152, a distortion corrected image for correcting the distortion in the image due to the tilt projection can be generated according to the vertical correction ratio KRSY, and inclinations $\theta 1X$ and $\theta 2X$, which are easily set by the user. Since the inclinations $\theta 1X$ and $\theta 2X$ can be separately determined, not only the distorted images with horizontal symmetry but also those without horizontal symmetry can be corrected.

Also, in the above embodiment, interpolation of dropout lines is performed using the lines before and after the dropout line, but interpolation may be performed using the dropout line and one or two lines neighboring the dropout line. The same is true for interpolation of dropout pixels. When performing interpolation processing using the dropout lines or dropout pixels themselves, the image is read from the frame memory 120 at twice or more the speed of display, and interpolation processing is performed. At this time, a latch circuit which latches image signals that have been read at twice the speed at the display speed (i.e., a buffer circuit) is provided to the trapezoid distortion correction circuit 152. Also, the methods for generating reading addresses in the vertical correction control circuit 180 and horizontal correction control circuit 190 may differ, but they are basically the same as the processing of the trapezoid distortion correction circuit 152 described above.

As can be understood from the above description, according to the first embodiment, the video processor 122 corresponds to the image correction section in the present invention. Also, the horizontal correcting circuit 172 corresponds to the first correction section, and the vertical correcting circuit 170 corresponds to the second correction section.

B. Second Embodiment

The components of the image processing devices in the second embodiment are the same as the image processing device 100 in the first embodiment. The difference between the first embodiment and the second embodiment is the contents of processing for generating the distortion corrected image for trapezoid distortion correction. The following is a description of the contents of processing for generating the distortion corrected image according to the second embodiment.

B-1. Overview of the Distortion Corrected Image

FIGS. 13(A)–13(D) are explanatory diagrams showing the procedures of distortion correction processing according to the second embodiment. First, as shown in FIG. 13(A), the entire original image MF is reduced at the reduction/filter circuit 144 (FIG. 3), creating a reduced image MFa shown in FIG. 13(B). Incidentally, the original image MF is the same as that shown in FIG. 4(A) with reference to the first embodiment, with the width ORGX (=IMGY) in the horizontal direction being 700 pixels, and the height ORGY (=IMGY) in the vertical direction being 500 lines. The width of the reduction image MFa in the horizontal direction is set so as to be equal to the shorter of the top and bottom of the trapezoid making up the trapezoid image portion CF1a. Also, the reduction ratio of the reduced image MFa in the vertical direction to the original image MF is set at the vertical correction ratio KRSY squared. This reduction ratio will be described later. Accordingly, with the example shown in FIG. 13(B), the horizontal width MEMX of the reduced image MFa stored in the frame memory 120 is 600 pixels, and the height MEMY in the vertical direction is 370 lines. The reduced image MFa obtained by the reduction/filter circuit 144 is stored in the frame memory 120. Next, as shown in FIG. 13(C), at the trapezoid distortion correction circuit 152 (FIG. 3), the reduced image MFa is enlarged at each line by a horizontal enlargement ratio FRSX' according to the inclinations ($\theta1X' \approx 0.11$) and ($\theta2X' \approx 0.16$) of the left edge and right edge of the trapezoid image portion CF1a'. Further, as shown in FIG. 13(D), the trapezoid image portion CF1a of the distortion corrected image CF1 is obtained by enlarging in the vertical direction by the overall vertical enlargement ratio (KRSY$\approx$1.16). Here, enlargement in the vertical direction is performed so the enlargement ratio is greater in the lower side of the reduced image MFa with the upper side as a reference to correct the greater magnification ratio in the upper side of the display image than in the lower side due to the upwards tilt projection.

Now, as shown in FIG. 13(C), the inclinations $\theta1X'$ and $\theta2X'$ represent the inclination of the left edge and right edge of the trapezoid image portion CF1a when the reduced image MFa is enlarged only in the horizontal direction. The inclinations $\theta1X'$ and $\theta2X'$ are obtained by the following expressions (12a) and (12b).

$$\theta1X' = \frac{\theta1X \cdot (IMGY - 1)}{MEMY - 1} \quad (12a)$$

$$\theta2X' = \frac{\theta2X \cdot (IMGY - 1)}{MEMY - 1} \quad (12b)$$

Alternatively, the inclinations $\theta1X'$ and $\theta2X'$ may be directly specified.

The projected image projected on the screen according to the trapezoid image portion CF1a shown in FIG. 13(D) will be approximately rectangular. That is, the top portion of the trapezoid image portion CF1a is optically enlarged by a greater enlargement ratio than the bottom portion to be projected and displayed. On the other hand, the lower portion of the trapezoid image portion CF1a is electronically enlarged with a greater enlargement ratio than the top portion. Considering such optical and electronic enlargement together, the upper and lower edges of the reduced image MFa are each horizontally enlarged at about the same overall enlargement ratio to make the projected image. Accordingly, each portion of the projected image is enlarged from the reduced image MFa by a uniform enlargement ratio, overall (electronically/optically). In this way, according to the second embodiment, all portions of the projected image are each horizontally enlarged by a constant enlargement ratio and projected and displayed, and thus is advantageous in comparison to the first embodiment because the image quality within the projected image can be made to be more uniform.

B-2. Operation of the Trapezoid Distortion Correction Circuit 152

The operation of the trapezoid distortion correction circuit 152 in the second embodiment is basically the same as the first embodiment, and there is a difference in the contents of processing the various parameters relating to the operation of the horizontal correction control circuit 190 and the pixel address generating circuit 202. The following is a description of the contents of processing the various parameters relating to the operation of the horizontal correction control circuit 190 and the pixel address generating circuit 202 according to the second embodiment which differ from those of the first embodiment.

FIG. 14 is an explanatory diagram showing the parameters calculated for each line in the vertical direction, of the various parameters relating to the operation of the horizontal correction control circuit 190 and the pixel address generating circuit 202. The parameters are calculated based on the reduced image MFa (MEMX=600 pixels, MEMY=370 lines) shown in FIG. 13(B), the display image area IF (ORGX=700 pixels, ORGY=500 lines) which is equivalent to the original image MF (ORGX=700 pixels, ORGY=500 lines) shown in FIG. 13(A), inclination $\theta1X' \approx 0.11$, and inclination $\theta2X' \approx 0.16$. The parameters in FIG. 14 are basically the same as those shown in FIG. 8 in the first embodiment. However, while FRSX in FIG. 8 represents the ratio (horizontal correction ratio) between the horizontal number of pixels IMGX of the display image area IF and the horizontal number of pixels of the area where the original image is displayed, FRSX' in FIG. 14 represents the ratio (horizontal enlargement ratio) between MEMX which is the horizontal number of pixels of the reduced image MFa and the horizontal number of pixels of the trapezoid image portion CF1a, i.e., the area wherein the reduced image MFa is displayed.

The horizontal correction control circuit 190 (FIG. 3) in the second embodiment calculates the reading line address MLAD* according to the reference line address BLAD* which is obtained based on the first line selecting signal DSPV and line address LAD in the same manner as with the first embodiment. Further, the starting pixel address STA and ending pixel address EDA are calculated by the following expressions (13a) and (13b), based on the inclinations $\theta1X'$ and $\theta2X'$, MEMY which is the number of lines in the vertical direction in the reduced image MFa, IMGX which is the number of pixels in the horizontal direction in the display image area IF, and the reading line address MLAD*.

$$STA = \theta1X' \cdot [(MEMY-1) - MLAD] \quad (13a)$$

$$EDA = IMGX - \theta2X' \cdot [(MEMY-1) - MLAD] \quad (13b)$$

Also, the horizontal enlargement ratio FRSX' of the trapezoid image portion CF1a to the reduced image MFa, i.e., the horizontal enlargement ratio for each horizontal line in the original image MF, is calculated by the following expression (14), based on the starting pixel address STA, ending pixel address EDA, and MEMX which is the number of pixels in the horizontal direction in the original image MF.

$$FRSX' = \frac{EDS - STA + 1}{MEMX} \quad (14)$$

As with the first embodiment, the first line selecting signal DSPV is maintained at an L level during the KSY line portion at the top of FIG. 13(D), and the black level signal VBLK is selected and output from the horizontal correcting circuit 172 (FIG. 3) as output image signals RV2. Also, while the first line selecting signal DSPV is at an L level, the reading line address MLAD* does not change from 0, and the values of the parameters calculated based on expressions (13a), (13b) and (14) do not change either. After the first line selecting signal DSPV changes to an H level, the values of the parameters are calculated according to the change in the reading line address MLAD*.

As described above, the starting pixel address STA can be calculated based on the inclination θ1X', and the ending pixel address EDA can be independently calculated based on the inclination θ2X'. Thus, the horizontal enlargement ratio FRSX' can be obtained to specify how many pixels in each line in the display image area IF (FIG. 4) corresponds to a line in the reduced image MFa (FIG. 13(B)).

FIG. 15 shows parameters calculated for each pixel within a line among the various parameters relating to the operation of the horizontal correction control circuit 190 and the pixel address generating circuit 202, where the line address LAD= 399 (See FIG. 14). The parameters shown in FIG. 15 are the same as the parameters shown in FIG. 9 with reference to the first embodiment. Here, description will be made regarding only the parameters of which the contents of processing differ.

The second pixel address control signal PADC2 changes to the H level when the division result RSPAD are the same value as the preceding result, and otherwise remains at the L level. That is, each time the reference pixel address is updated the horizontal correction control circuit 190 divides the reference pixel address BPAD by the horizontal enlargement ratio FRSX', and when the division result RSPAD are the same value as the preceding result, changes the second line address control signal LADC2 to the H level. On the other hand, when the division result RSPAD is incremented by +1 from the preceding division result, the horizontal correction control circuit 190 changes the second pixel address control signal PADC2 to the L level. In the example shown in FIG. 15, it can be understood the second pixel address control signal PADC2 is at the H level when the reference pixel address BPAD is 5.

The reading pixel address MPAD may change only while the first pixel address control signal PADC1 is at an H level. The reading pixel address MPAD is incremented by +1 except for the time when the second pixel address control signal PADC2 changes from the H level to the L level, and when the second pixel address control signal PADC2 changes from the H level to the L level, the reading pixel address MPAD is not incremented. In FIG. 15, e.g., the division result RSPAD remain unchanged at 4 while the reference pixel address BPAD is 4 and 5. PADC2 changes from the L level to the H level when the reference pixel address BPAD is 5, and changes from the H level to the L level when the reference pixel address BPAD is 6. Accordingly, even when the reference pixel address BPAD changes from 5 to 6, the reading pixel address MPAD remains unchanged at 5.

FIG. 16 is an explanatory diagram showing the various parameters relating to the operation of the vertical correction control circuit 180 and line address generating circuit 200. The parameters shown in FIG. 16 are the same as those shown in FIG. 11 for the first embodiment. Here, description will be made regarding only the parameters of which the contents of processing differ.

The value of the line address LAD from which increment of the reference line address begins (start line address STLAD) is calculated by the following expressions (15a) and (15b), based on the vertical correction ratio KRSY and IMGY which is the number of lines in the vertical direction of the display image area IF.

$$KSSY = KRSY \cdot IMGY \quad (15a)$$

$$STLAD = IMGY - KSSY \quad (15b)$$

Also, the offset line address OFFLAD is calculated by the following expressions (16a) through (16c).

$$OFF = KSSY - MEMY \quad (16a)$$

$$BLAD = LAD - STLAD \quad (16b)$$

$$OFFLAD = OFF \cdot \left[1 - \sin\left\{\frac{\pi}{2} \cdot \frac{KSSY - BLAD}{KSSY - 1}\right\}\right] \quad (16c)$$

The reading line address MLAD is calculated from the following expression (17) based on the reference line address BLAD and offset address OFFLAD.

$$MLAD = BLAD - OFFLAD \quad (17)$$

The offset address OFFLAD indicates the positions in the 430 lines of the trapezoid image portion CF1a where the difference in number of lines between the original image MF and the trapezoid image portion CF1a will be absorbed, and is set to correct the enlarging distortion generated in the vertical direction by tilt projection.

With the circuit shown in FIG. 3, the line address generating circuit 200 does not use the expressions (15a)–(17), but updates the reading line address MLAD according to the first and second line address control signals LADC1 and LADC2, provided from the vertical correction control circuit 180.

Figure 19A:
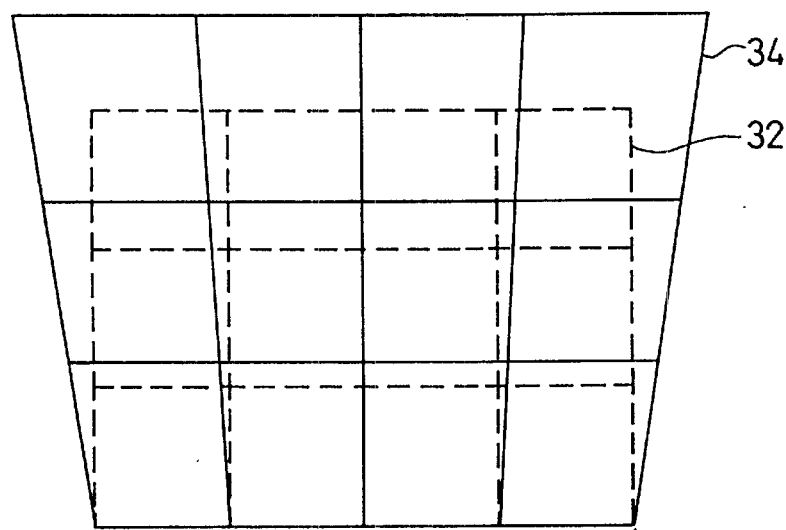
FIGS. 19(A) and 19(B) are explanatory diagrams showing a method for electrically processing and correcting an image.
Figure 19B:
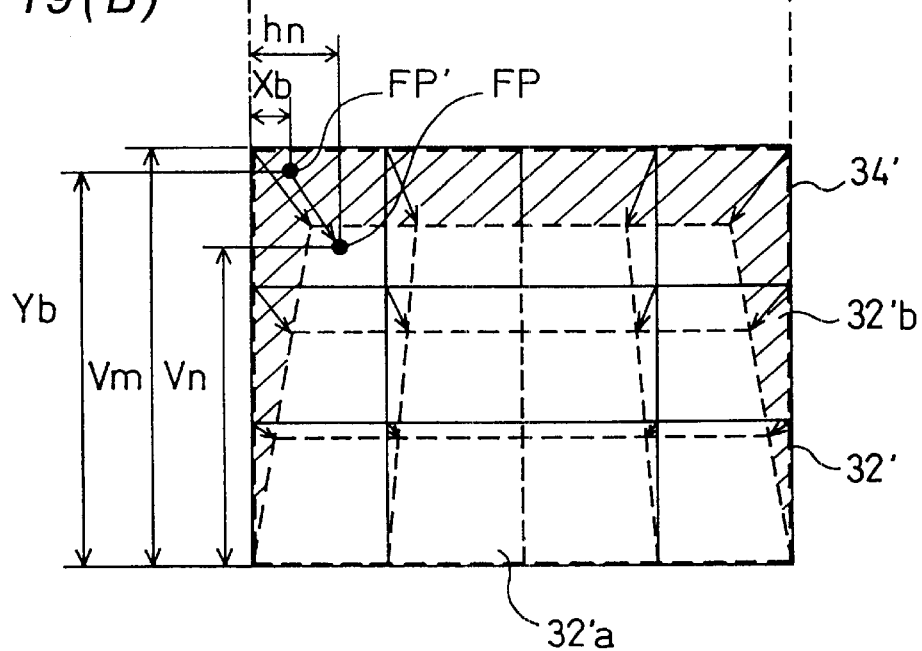

The second line address control signal LADC2 maintains the L level when the offset line address OFFLAD changes from that at the preceding line address LAD, and the reading line address MLAD may change only while the level of the first line address control signal LADC1 is H. The reading line address MLAD is incremented by +1 except for the time when the line address control signal LADC2 changes from the H level to the L level, and when the line address control signal LADC2 changes from the H level to the L level, the reading line address MLAD is not incremented. In FIG. 19, when the reference line address BLAD changes from 180 to 181, the offset line address OFFLAD changes from 12 to 13, and the line address control signal LADC2 changes from the L level to the H level. Then, when the reference line address BLAD changes from 181 to 182, the offset line address OFFLAD maintains 13, and the line address control signal LADC2 changes from the H level to the L level. Accordingly, even when the reference line address BLAD changes from 181 to 182, the reading line address MALD remains unchanged at 169.

Incidentally, the operation of the horizontal correcting circuit 172 and vertical correcting circuit 170 is the same as shown in the timing chart for the first embodiment shown in FIG. 9 and FIG. 11; accordingly, a description thereof will be omitted.

FIGS. 17(A-1)–17(A-3) and 17(B-1)–17(B-3) are explanatory diagrams showing the relationship between the distortion corrected image CF1 and the projected display image in the vertical direction. In the first embodiment, the original image MF having 500 lines in the vertical direction, shown in FIG. 17(A-1), is reduced in the vertical direction to make a distortion corrected image CF shown in FIG. 17(A-2), and this distortion corrected image CF is projected to produce a display image with practically no distortion, as shown in FIG. 17(A-3). The lines of the original image MF with the line addresses of 37, 161, 281, 394, and 499 respectively correspond to the lines of the distortion corrected image CF with the line addresses of 99, 199, 299, 399, and 499. Further, the images of the distortion corrected image CF for each of the sections between the lines with the line addresses of 99–199, 199–299, 299–399, and 399–499, are displayed in the respective sections with the line addresses of 37–161, 161–281, 281–394, and 394–499. Accordingly, a section of 124 lines in the display image with the line addresses 37–161 is displayed from an image portion of 100 lines in the distortion corrected image CF, so the substantial line density KL in this section is approximately 0.81 (=100/124). In the same manner, the substantial line densities KL in the sections in the display image with the line addresses 161–281, 281–394, and 394–499 respectively are approximately 0.83, 0.89, and 0.95. In this way, with the first embodiment, the substantial line density in the display image varies greatly according to the vertical position, and consequently the substantial resolution in the vertical direction differs greatly at the top and bottom of the displayed image.

In the second embodiment, on the other hand, the original image MF having 500 lines in the vertical direction shown in FIG. 17(A-1) is reduced in the vertical direction as shown in FIG. 17(B-1), a distortion corrected image CF1 is produced as shown in FIG. 17(B-2) by vertically enlarging the reduced image MFa, and this distortion corrected image CF1 is projected to display an image with practically no distortion, as shown in FIG. 17(B-3). The lines of the reduced image MFa with the line addresses of 29, 122, 209, 290, and 369 respectively correspond to the lines of the distortion corrected image CF1 with the line addresses of 99, 199, 299, 399, and 499. The 100 lines between line addresses 99–199 in the distortion corrected image CF1 are enlarged from 93 lines of the reduced image MFa, so the substantial number of lines ML in this section is 93. In the same manner, the substantial numbers of lines ML (i.e., the number of lines included in the reduced image MFa) between of the line addresses 199–299, 299–399, and 399–499 of the corrected image CF1 respectively are 87, 81, and 79. Accordingly, an image section of 100 lines of the distortion corrected image CF1 with an substantial number of lines ML of 93 is displayed on the 124 display lines between the line addresses 37–161 on the display image, so the substantial line density KL in this section is approximately 0.75 (=93/124). In the same manner, the substantial number of lines ML in the sections in the display image with the line addresses 161–281, 281–394, and 394–499 are 87, 81, and 79, so the substantial line densities KL in these sections respectively are approximately 0.73, 0.72, and 0.75. In this way, the processing of the second embodiment can reduce variation in the substantial resolution in the vertical direction between the top and bottom of the display image as compared to the first embodiment, and thus is advantageous because the image quality in the vertical direction of the projected and displayed image can be made to be more uniform.

According to the distortion in the vertical direction due to the upward tilt projection, the enlargement ratio is greater in higher position on the image, and the line density of the image displayed on the projection screen is smaller at the top of the image and greater at the bottom. Accordingly, it is preferable the substantial number of lines of the original image MF included in a portion near the smaller base of the trapezoid image CF1a is greater, and the substantial number of lines of the original image MF included in the larger base thereof is small.

Also, as described above, the second embodiment is advantageous because the image quality in the horizontal direction is more uniform than that of the first embodiment. Accordingly, the second embodiment is advantageous because the image quality of the image displayed by tilt projection can be made to be more uniform.

Also, it is preferable the overall vertical enlargement ratio KRSY' will correct the variation in line density due to tilt projection in the vertical direction in which the line density at the top side of the displayed image is lower than that at the lower side. Accordingly, in the present embodiment, the original image MF is reduced to the reduced image MFa, and then the vertical enlargement ratio KRSY' is set to an inverse of the vertical correction ratio KRSY so the reduced image MFa is enlarged more at the bottom side than at the top side with the top side thereof as a reference. Alternatively, the vertical number of lines of the reduced image MFa may be determined so the trapezoid image CF1a is produced by enlarging the reduced image in the vertical direction by a number of lines equal to the vertical number of lines KSY of the supplementary image portion CF1b shown in FIG. 13(D). That is, the number of lines of the reduced image MFa is set so as to be equal to or less than the number of lines of the effective image portion CF1a of the distortion corrected image, so the vertical enlargement ratio KRSY' is set to be 1 or greater.

Incidentally, the effects of deterioration of resolution in the vertical direction on the image quality are not very marked, so the vertical enlargement ratio KRSY' may be set to 1, and enlarging processing in the vertical direction may not executed in the trapezoid distortion correction circuit 152. Also, vertical distortion correction may be executed in the same manner as in the first embodiment. In this case, an image formed by reducing the original image MF only in the horizontal direction will be used as the reduced image MFa. The distortion correction in the horizontal direction will be performed by enlarging the reduced image MFa as described above, and the distortion correction in the vertical direction will be performed by image reduction to offset the enlargement of the image owing to tilt projection.

As described above, the horizontal correcting circuit 172 shown in FIG. 3 can determine which pixel of the original image MF (FIG. 13) corresponds to each pixel of each line in the display image area IF (FIG. 12) of the liquid crystal panel 126 (FIG. 1) in the second embodiment as well, based on the horizontal trapezoid distortion correcting parameters (FIG. 14 and FIG. 15) calculated in the horizontal correction control circuit 190. Further, in the expressions (13a), (13b) and (14) used in this calculation, the only horizontal correction parameters which the user needs to adjust for trapezoid distortion correcting are inclinations $\theta 1X'$ and $\theta 2X'$ (i.e., inclinations $\theta 1X$ and $\theta 2X$). Accordingly, adjustment is easy. Also, the inclinations $\theta 1x'$ and $\theta 2x'$ can be independently set, so trapezoid distortion can be corrected even when there is not only a vertical tilt angle, but there is also a tilt angle in the horizontal direction where the shape of the trapezoid distortion is not horizontally symmetrical.

Incidentally, when the shape of the trapezoid distortion is horizontally symmetrical, θ1X is equal to θ2X, and a common inclination θX can be used to correct the trapezoid distortion.

Further, the vertical correcting control circuit 180 can determine which line of the original image MF (FIG. 13) corresponds to each line in the display image area IF (FIG. 12) of the liquid crystal panel 126 (FIG. 1), based on the vertical correcting parameters (FIG. 16). Further, in the expressions (15a) through (17) used in this determination, the only vertical correction parameter which the user needs to adjust for correcting the distortion in the image generated by tilt projection is the vertical correction ratio KRSY, so adjustment can be made more easily than in the conventional technique.

Moreover, in the above second embodiment, the original image MF is reduced, and the trapezoid image portion CF1a of the distortion corrected image CF1 is generated by enlarging each horizontal line of the reduced image MFa at a horizontal enlarging ratio depending on the inclinations of the left edge and right edge of the trapezoid image portion CF1a. Accordingly, the image quality at the top side and bottom side of the projected image can be made to be practically the same.

Also, even though description of the operation of the vertical correction control circuit 170 and horizontal correcting circuit 172 is made when the horizontal enlargement/reduction ratio RSX=1 and the vertical enlargement/reduction ratio RSY=1, the enlargement/reduction ratios RSX and RSY may be set at a range equal to or greater than 1. For example, there are cases in which the width of the original image MF is smaller than the number of horizontal pixels at the bottom of the trapezoid image portion CF1a of the distortion corrected image CF1. In such cases, the image stored in the frame memory 120 can be enlarged to the size of the display image area IF by setting the enlargement/reduction ratios RSX and RSY to suitable values. In such a case, enlarging processing for trapezoid distortion correction alone is performed at the trapezoid distortion correction circuit 152, and enlarging according to the enlargement/reduction ratios RSX and RSY is performed at the enlarging/filter circuit 154. Incidentally, as mentioned above, the trapezoid distortion correction circuit 152 executes enlargement of the reduced image MFa according to the horizontal enlargement ratio KRSX' and vertical enlargement ratio KRSY', while acting as an enlargement/filter circuit. Accordingly, the enlarging/filter circuit 154 can be omitted by using the horizontal enlargement ratio KRSX' and vertical enlargement ratio KRSY' multiplied by the horizontal enlargement/reduction ratio RSX and the vertical enlargement/reduction ratio RSY, respectively.

The distortion-corrected image can be written into the frame memory 120, by disposing the enlarging/filter circuit 154 between the reduction/filter circuit 144 and the reading/writing control circuit 146.

As can be understood from the above description, with the second embodiment, the video processor 122 implements the image correction section in the claimed invention, and the reduction/filter circuit 144 and the trapezoid distortion correction circuit 152 implement the first correction section. Also, the reduction/filter circuit 144 implements the reducing section, the horizontal correcting circuit 172 implements the horizontal correction section, and the vertical correcting circuit 170 implements the vertical correction section.

According to the present invention, a distortion-correcting image for correcting a distorted image due to tilt projection can be generated according to the vertical correction ratio KRSY which is a vertical correction parameter which can be easily set by the user, and horizontal correction parameters of inclinations θ1X and θ2X, or XST and XED which are the number of upper left/upper right supplementary pixels. The horizontal correction parameters can be each independently set at the left side and right side of the image, so not only can symmetrical distorted images be corrected, but non-symmetrical distorted images can be corrected, as well. Further, in the second embodiment, a variation in resolution caused by the trapezoid distortion can be suppressed during the generation of the distortion corrected image, thereby suppressing deterioration of image quality.

Incidentally, the present invention is not restricted to the above examples or embodiments, but can be carried out in various forms within a scope not departing from the spirit thereof, and the following variations may be also, made, for example.

(1) A part of the configuration realized in the above embodiments by hardware may be replaced with software, or conversely, a part of the configuration realized by software may be replaced with hardware.

(2) In the above embodiments, line dropout and pixel dropout at the time of trapezoid distortion correction is relieved by weighted mean processing of the image data, but interpolation processes other than weighted mean processing may be used to relieve the image dropout. Various processes can be used for the interpolation processing, such as geometrical mean, linear interpolation, non-linear interpolation, and so forth.

(3) In the above embodiments, an example of an image processing device in a projection-type display apparatus having a liquid crystal light valve (liquid crystal panel) as the light modulating mechanism thereof is described, but the present invention can be applied to other devices having two dimensionally arrayed pixels in the same manner as a liquid crystal light valve, such as a plasma display and so forth. The present invention is also applicable to apparatuses having CRTs.

(4) The above embodiments are described with examples using two independent parameters (*e.g.*, θ1X and θ2X) as horizontal correction parameters representing the horizontal amount of correction, but when the horizontal amount of correction is symmetrical, the distortion correction can be executed with a common horizontal correction parameter (e.g., an inclination θX equivalent to either inclination θ1X or θ2X).

In addition, the present invention is applicable to image processing devices for projection-type display apparatuses for displaying images by projection, for example, liquid crystal projectors. The present invention is not limited to the image display devices having liquid crystal panels, but it is also applicable to projection-type display apparatuses having a light modulator, such as CRT or DIGITAL MICRO-MIRROR DEVICE (trademark of Texas Instrument Inc.).

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed is:

1. An image processing device, comprising:
   an image correction section configured to produce a distortion-corrected image obtained by correcting a shape of an original image, and configured to supply the distortion-corrected image to an image forming section of a projection-type display apparatus which projects and displays on a screen an image formed at the image forming section, so as to correct distortion in the displayed image caused when an undistorted original image formed at the image forming section is subjected to tilt projection onto the screen,
   said image correction section including:
   a first correction section configured to determine a display pixel range between a display start position and a display end position of the distortion-corrected image on each horizontal line of the image forming section, based on horizontal correction parameters representing distortion-correction amounts at left- and right-sides of the distortion-corrected image, configured to determine a first relationship between each pixel within the display pixel range and each pixel in the original image based on a relationship between the number of pixels in the display pixel range and the number of pixels in one line in the original image, and configured to produce the distortion-corrected image from the original image according to the first relationship.

2. An image processing device according to claim 1, wherein the horizontal correction parameters include at least two parameters representing the distortion correction amounts at the left- and right-sides of the distortion-corrected image, and
   wherein the distortion correction amounts at the left- and right-sides can be independently set.

3. An image processing device according to claim 1, wherein the first correction section includes a pixel filter processor configured to perform interpolation filtering, based on the original image, to pixels within the display pixel range of the distortion-corrected image.

4. An image processing device according to claim 1, wherein the image correction section further includes a second correction section configured to determine a display line range between a display start line and a display end line of the distortion corrected image on the image forming section, based on vertical correction parameters representing distortion-correction amounts in the vertical direction of the distortion-corrected image, configured to determine a second relationship between each line within the display line range and each line in the original image, and configured to produce the distortion-corrected image from the original image according to the second relationship.

5. An image processing device according to claim 4, wherein the second relationship is determined based on a height of a substantially trapezoid-shaped effective image portion in the distortion-corrected image and a height of the original image, and
   wherein the second relationship represents that the number of lines in the original image corresponding to a specific line in the effective image portion is greater as the specific line comes closer to the smaller base of the substantially trapezoid-shaped form, and that the number of lines in the original image corresponding to a specific line in the effective image portion decreases as the specific line comes closer to the larger base of the substantially trapezoid-shaped form.

6. An image processing device according to claim 5, wherein the second relationship is determined by the following expression:

$$MLAD = \frac{1}{RSY} \cdot \left[ \{LAD - (IMGY - KSSY)\} + (IMGY - KSSY) \cdot \sin\left\{\frac{\pi}{2} \cdot \frac{LAD - (IMGY - KSSY)}{KSSY - 1}\right\} \right]$$

where MLAD represents a line position in the original image, RSY represents a ratio of a height of the display image area to a height of the original image, LAD represents a line position in the display line range, IMGY represents a height of the original image, and KSSY represents a height of the substantially trapezoid-shaped effective image portion.

7. An image processing device according to claim 4, wherein the second correction section includes a line filter processor configured to perform interpolation filter processing, based on the original image, to lines within the display line range of the distortion-corrected image.

8. An image processing device, comprising:
   an image correction section configured to produce a distortion-corrected image obtained by correcting a shape of an original image, and configured to supply the distortion-corrected image to an image forming section of a projection-type display apparatus which projects and displays on a screen an image formed at the image forming section, so as to correct distortion in the displayed image caused when an undistorted original image formed at the image forming section is subjected to tilt projection onto the screen,
   the image correction section including:
   a reducing section configured to reduce the original image to produce a reduced image; and
   a horizontal correction section configured to enlarge each horizontal line in the reduced image by an enlargement ratio of at least 1 which depends on horizontal correction parameters representing distortion correction amounts of left- and right-sides of the distortion-corrected image and on a position of each horizontal line, and configured to produce a distortion-corrected image for correcting the left- and right-side distortion.

9. An image processing device according to claim 8, wherein a horizontal width of the reduced image is equal to a minimum horizontal width of a substantially trapezoid-shaped effective image portion in the distortion-corrected image.

10. An image processing device according to claim 8, wherein the horizontal correction parameters include at least two parameters representing the distortion correction amounts at the left- and right-sides of the distortion-corrected image, and
    wherein the distortion correction amounts at the left- and right-sides can be independently set.

11. An image processing device according to claim 8, wherein the horizontal correction section includes a pixel filter processor configured to perform interpolation filter processing, based on the reduced image, to pixels within the display pixel range of the distortion-corrected image.

12. An image processing device according to claim 8, wherein a height in the vertical direction of the reduced image is equal to or less than a height in the vertical direction of the substantially trapezoid-shaped effective image portion in the distortion-corrected image, and wherein the image correction section further includes a vertical correction section configured to determine a display line range between a display start line and a display end line of the distortion-corrected image at the image forming section, based on vertical correction parameters representing distortion-correction amounts in the vertical direction of the distortion-corrected image, configured to determine a relationship between each line within the display line range and each line in the reduced image, and configured to enlarge the reduced image based on the relation to produce the distortion-corrected image.

13. An image processing device according to claim 12, wherein the relationship is determined to adjust a vertical enlargement ratio from the reduced image to the distortion-corrected image at each position in vertical direction so the substantially trapezoid-shaped effective image portion in the distortion-corrected image is enlarged from the reduced image so as to compensate for distortion in the vertical direction caused when an undistorted original image formed at the image forming section is subjected to tilt projection onto the screen.

14. An image processing device according to claim 13, wherein the relationship is determined based on a height of the substantially trapezoid-shaped effective image portion in the distortion-corrected image and a height of the reduced image, and wherein the relationship represents that the substantial number of lines in the original image corresponding to a specific line in the effective image portion is greater as the specific line comes closer to the smaller base of the substantially trapezoid-shaped form, and that the substantial number of lines in the original image corresponding to a specific line in the effective image portion decreases as the specific line comes closer to the larger base of the substantially trapezoid-shaped form.

15. An image processing device according to claim 14, wherein the relationship is determined by the following expression:

$$MLAD = \{LAD - (IMGY - KSSY)\} - (KSSY - MEMY) \cdot \left[1 - \sin\left\{\frac{\pi}{2} \cdot \frac{KSSY - (LAD - (IMGY - KSSY))}{KSSY - 1}\right\}\right]$$

where MLAD represents a line position in the original image, LAD represents a line position in the display line range, IMGY represents a height of the original image, KSSY represents a height of the substantially trapezoid-shaped effective image portion, and MEMY represents a height of the reduced image.

16. An image processing device according to claim 12, wherein the vertical correction section includes a line filter processor configured to perform interpolation filter processing, based on the reducing image, to lines within the display line range of the distortion-corrected image.

17. An image processing method, comprising:

an image correction step of producing a distortion-corrected image obtained by correcting a shape of an original image and supplying the distortion-corrected image to an image forming section of a projection-type display apparatus which projects and displays on a screen an image formed at the image forming section, so as to correct distortion in the displayed image caused when an undistorted original image formed at the image forming section is subjected to tilt projection onto the screen, the image correction step including a first correction step of determining a display pixel range between a display start position and a display end position of the distortion corrected image on each horizontal line of the image forming section, based on horizontal correction parameters representing distortion-correction amounts at left- and right-sides of the distortion-corrected image, and determining a first relationship between each pixel within the display pixel range and each pixel in the original image based on a relationship between the number of pixels in the display pixel range and the number of pixels in one line in the original image, and producing the distortion-corrected image from the original image according to the first relationship.

18. An image processing method according to claim 17, wherein the horizontal correction parameters include at least two parameters representing the distortion correction amounts at the left- and right-sides of the distortion-corrected image, and wherein the distortion correction amounts at the left- and right-sides can be independently set.

19. An image processing method according to claim 17, wherein the first correction step includes a step of performing interpolation filtering, based on the original image, to pixels within the display pixel range of the distortion-corrected image.

20. An image processing method according to claim 17, wherein the image correction step further includes a second correction step of determining a display line range between a display start line and a display end line of the distortion corrected image on the image forming section, based on vertical correction parameters representing distortion-correction amounts in the vertical direction of the distortion-corrected image, determining a second relationship between each line within the display line range and each line in the original image, and producing the distortion-corrected image from the original image according to the second relationship.

21. An image processing method according to claim 20, wherein the second relationship is determined based on a height of a substantially trapezoid-shaped effective image portion in the distortion-corrected image and a height of the original image, and wherein the second relationship represents that the number of lines in the original image corresponding to a specific line in the effective image portion is greater as the specific line comes closer to the smaller base of the substantially trapezoid-shaped form, and that the number of lines in the original image corresponding to a specific line in the effective image portion decreases as the specific line comes closer to the larger base of the substantially trapezoid-shaped form.

22. An image processing method according to claim 21, wherein the second relationship is determined by the following expression:

$$MLAD = \frac{1}{RSY} \cdot \left[\{LAD - (IMGY - KSSY)\} + (IMGY - KSSY) \cdot \sin\left\{\frac{\pi}{2} \cdot \frac{LAD - (IMGY - KSSY)}{KSSY - 1}\right\}\right]$$

where MLAD represents a line position in the original image, RSY represents a ratio of a height of the display image area to a height of the original image, LAD represents a line position in the display line range, IMGY represents a height of the original image, and KSSY represents a height of the substantially trapezoid-shaped effective image portion.

23. An image processing method according to claim 20, wherein the second correction step includes a step of performing interpolation filter processing, based on the original image, to lines within the display line range of the distortion-corrected image.

24. An image processing method, comprising:
   an image correction step of producing a distortion-corrected image obtained by correcting a shape of an original image and supplying the distortion-corrected image to an image forming section of a projection-type display apparatus which projects and displays on a screen an image formed at the image forming section, so as to correct distortion in the displayed image caused when an undistorted original image formed at the image forming section is subjected to tilt projection onto the screen,
   the image correction step including:
   a reduction step of reducing the original image to produce a reduced image; and
   a horizontal correction step of enlarging each horizontal line in the reduced image by an enlargement ratio of at least 1 which depends on horizontal correction parameters representing distortion correction amounts of left- and right-sides of the distortion-corrected image and on a position of each horizontal line, and producing a distortion-corrected image for correcting the left- and right-side distortion.

25. An image processing method according to claim 24, wherein a horizontal width of the reduced image is equal to a minimum horizontal width of the substantially trapezoid-shaped effective image portion in the distortion-corrected image.

26. An image processing method according to claim 24, wherein the horizontal correction parameters include at least two parameters representing the distortion correction amounts at the left- and right-sides of the distortion-corrected image, and
   wherein the distortion correction amounts at the left- and right-sides can be independently set.

27. An image processing method according to claim 24, wherein the horizontal correction step includes a step of performing interpolation filter processing, based on the reduced image, to pixels within the display pixel range of the distortion-corrected image.

28. An image processing method according to claim 24, wherein a height in the vertical direction of the reduced image is equal to or less than a height in the vertical direction of the substantially trapezoid-shaped effective image portion in the distortion-corrected image, and
   wherein the image correction step further includes a vertical correction step of determining a display line range between a display start line and a display end line of the distortion-corrected image at the image forming section, based on vertical correction parameters representing distortion-correction amounts in the vertical direction of the distortion-corrected image, determining a relationship between each line within the display line range and each line in the reduced image, and enlarging the reduced image based on the relationship to produce the distortion-corrected image.

29. An image processing method according to claim 28, wherein the relationship is determined to adjust a vertical enlargement ratio from the reduced image to the distortion-corrected image at each vertical direction position so the substantially trapezoid-shaped effective image portion in the distortion-corrected image is enlarged from the reduced image so as to compensate for vertical distortion in the displayed image caused when an undistorted original image formed at the image forming section is subjected to tilt projection onto the screen.

30. An image processing method according to claim 29, wherein the relationship is determined based on a height of a substantially trapezoid-shaped effective image portion in the distortion-corrected image and a height of the reduced image, and
   wherein the relationship represents that the substantial number of lines in the original image corresponding to a specific line in the effective image portion is greater as the specific line comes closer to the smaller base of the substantially trapezoid-shaped form, and that the substantial number of lines in the original image corresponding to a specific line in the effective image portion decreases as the specific line comes closer to the larger base of the substantially trapezoid-shaped form.

31. An image processing method according to claim 30, wherein the relationship is determined by the following expression:

$$MLAD = \{LAD - (IMGY - KSSY)\} -$$
$$(KSSY - MEMY) \cdot$$
$$\left[1 - \sin\left\{\frac{\pi}{2} \cdot \frac{KSSY - (LAD - (IMGY - KSSY))}{KSSY - 1}\right\}\right]$$

where MLAD represents a line position in the original image, LAD represents a line position in the display line range, IMGY represents a height of the original image, KSSY represents a height of the substantially trapezoid-shaped effective image portion, and MEMY represents a height of the reduced image.

32. An image processing method according to claim 28, wherein the vertical correction step includes a step of performing interpolation filter processing, based on the reducing image, to lines within the display line range of the distortion-corrected image.

33. An image processing system, comprising:
   image correction means for producing a distortion-corrected image obtained by correcting a shape of an original image and supplying the distortion-corrected image to an image forming section of a projection-type display apparatus which projects and displays on a screen an image formed at the image forming section, so as to correct distortion in the displayed image caused when an undistorted original image formed at the image forming section is subjected to tilt projection onto the screen; and
   the image correction means including first correction means for determining a display pixel range between a display start position and a display end position of the distortion corrected image on each horizontal line of the image forming section, based on horizontal correction parameters representing distortion-correction amounts at left- and right-sides of the distortion-corrected image, and for determining a first relationship between each pixel within the display pixel range and each pixel in the original image based on a relationship between the number of pixels in the display pixel range and the number of pixels in one line in the original image, and producing the distortion-corrected image from the original image according to the first relationship.

34. An image processing system according to claim 33, wherein the horizontal correction parameters include at least two parameters representing the distortion correction amounts at the left- and right-sides of the distortion-corrected image, and wherein the distortion correction amounts at the left- and right-sides can be independently set.

35. An image processing system according to claim 33, wherein the first correction means includes means for performing interpolation filtering, based on the original image, to pixels within the display pixel range of the distortion-corrected image.

36. An image processing system according to claim 33, wherein the image correction means further includes second correction means for determining a display line range between a display start line and a display end line of the distortion corrected image on the image forming section, based on vertical correction parameters representing distortion-correction amounts in the vertical direction of the distortion-corrected image, determining a second relationship between each line within the display line range and each line in the original image, and producing the distortion-corrected image from the original image according to the second relationship.

37. An image processing system according to claim 36, wherein the second relationship is determined based on a height of a substantially trapezoid-shaped effective image portion in the distortion-corrected image and a height of the original image, and wherein the second relationship represents that the number of lines in the original image corresponding to a specific line in the effective image portion is greater as the specific line comes closer to the smaller base of the substantially trapezoid-shaped form, and that the number of lines in the original image corresponding to a specific line in the effective image portion decreases as the specific line comes closer to the larger base of the substantially trapezoid-shaped form.

38. An image processing system according to claim 37, wherein the second relationship is determined by the following expression:

$$MLAD = \frac{1}{RSY} \cdot \left[ \{LAD - (IMGY - KSSY)\} - (IMGY - KSSY) \cdot \sin\left(\frac{\pi}{2} \cdot \frac{LAD - (IMGY - KSSY)}{KSSY - 1}\right) \right]$$

where MLAD represents a line position in the original image, RSY represents a ratio of a height of the display image area to a height of the original image, LAD represents a line position in the display line range, IMGY represents a height of the original image, and KSSY represents a height of the substantially trapezoid-shaped effective image portion.

39. An image processing system according to claim 36, wherein the second correction means includes means for performing interpolation filter processing, based on the original image, to lines within the display line range of the distortion-corrected image.

40. An image processing system, comprising:

image correction means for producing a distortion-corrected image obtained by correcting a shape of an original image and supplying the distortion-corrected image to an image forming section of a projection-type display apparatus which projects and displays on a screen an image formed at the image forming section, so as to correct distortion in the displayed image caused when an undistorted original image formed at the image forming section is subjected to tilt projection onto the screen, the image correction means including:

reduction means for reducing the original image to produce a reduced image; and horizontal correction means for enlarging each horizontal line in the reduced image by an enlargement ratio of at least 1 which depends on horizontal correction parameters representing distortion correction amounts of left- and right-sides of the distortion-corrected image and on a position of each horizontal line, and for producing a distortion-corrected image for correcting the left- and right-side distortion.

41. An image processing system according to claim 40, wherein a horizontal width of the reduced image is equal to a minimum horizontal width of the substantially trapezoid-shaped effective image portion in the distortion-corrected image.

42. An image processing system according to claim 40, wherein the horizontal correction parameters include at least two parameters representing the distortion correction amounts at the left- and right-sides of the distortion-corrected image, and wherein the distortion correction amounts at the left- and right-sides can be independently set.

43. An image processing system according to claim 40, wherein the horizontal correction means includes means for performing interpolation filter processing, based on the reduced image, to pixels within the display pixel range of the distortion-corrected image.

44. An image processing system according to claim 40, wherein a height in the vertical direction of the reduced image is equal to or less than a height in the vertical direction of the substantially trapezoid-shaped effective image portion in the distortion-corrected image, and wherein the image correction means further includes vertical correction means for determining a display line range between a display start line and a display end line of the distortion-corrected image at the image forming section, based on vertical correction parameters representing distortion-correction amounts in the vertical direction of the distortion-corrected image, for determining a relationship between each line within the display line range and each line in the reduced image, and for enlarging the reduced image based on the relationship to produce the distortion-corrected image.

45. An image processing system according to claim 44, wherein the relationship is determined to adjust a vertical enlargement ratio from the reduced image to the distortion-corrected image at each vertical direction position so the substantially trapezoid-shaped effective image portion in the distortion-corrected image is enlarged from the reduced image so as to compensate for vertical distortion in the displayed image caused when an undistorted original image formed at the image forming section is subjected to tilt projection onto the screen.

46. An image processing system according to claim 45, wherein the relationship is determined based on a height of a substantially trapezoid-shaped effective image portion in the distortion-corrected image and a height of the reduced image, and wherein the relationship represents that the substantial number of lines in the original image corresponding to a specific line in the effective image portion is greater as the specific line comes closer to the smaller base of the substantially trapezoid-shaped form, and that the substantial number of lines in the original image corresponding to a specific line in the effective image portion decreases as the specific line comes closer to the larger base of the substantially trapezoid-shaped form.

47. An image processing system according to claim 46, wherein the relationship is determined by the following expression:

$$MLAD = \{LAD - (IMGY - KSSY)\} - (KSSY - MEMY) \cdot \left[1 - \sin\left\{\frac{\pi}{2} \cdot \frac{KSSY - (LAD - (IMGY - KSSY))}{KSSY - 1}\right\}\right]$$

where MLAD represents a line position in the original image, LAD represents a line position in the display line range, IMGY represents a height of the original image, KSSY represents a height of the substantially trapezoid-shaped effective image portion, and MEMY represents a height of the reduced image.

48. An image processing system according to claim 44, wherein the vertical correction means includes means for performing interpolation filter processing, based on the reducing image, to lines within the display line range of the distortion-corrected image.

* * * * *